United States Patent
Jarrell

(10) Patent No.: US 9,087,451 B1
(45) Date of Patent: Jul. 21, 2015

(54) UNMANNED AERIAL VEHICLE COMMUNICATION, MONITORING, AND TRAFFIC MANAGEMENT

(71) Applicant: John A. Jarrell, Tiburon, CA (US)

(72) Inventor: John A. Jarrell, Tiburon, CA (US)

(*) Notice: Subject to any disclaimer, the term of this patent is extended or adjusted under 35 U.S.C. 154(b) by 28 days.

(21) Appl. No.: 14/444,670

(22) Filed: Jul. 28, 2014

Related U.S. Application Data

(60) Provisional application No. 62/024,197, filed on Jul. 14, 2014.

(51) Int. Cl.
*G08G 5/00* (2006.01)

(52) U.S. Cl.
CPC .................... *G08G 5/0069* (2013.01)

(58) Field of Classification Search
CPC .......... G08G 1/0104; G08G 1/096716; G08G 1/096775; G08G 1/096741; G08G 1/20
USPC ............................................ 701/13, 117–120
See application file for complete search history.

(56) References Cited

U.S. PATENT DOCUMENTS

| | | | | |
|---|---|---|---|---|
| 5,528,234 A * | 6/1996 | Mani et al. | .................. | 340/933 |
| 5,850,992 A * | 12/1998 | Flament et al. | ............... | 244/168 |
| 6,421,600 B1 * | 7/2002 | Ross | ............................. | 701/117 |
| 7,209,771 B2 * | 4/2007 | Twitchell, Jr. | ................ | 455/574 |
| 7,530,527 B2 * | 5/2009 | Kelleher | .......................... | 244/2 |
| 7,969,346 B2 * | 6/2011 | Franceschini et al. | ......... | 342/30 |
| 7,979,172 B2 * | 7/2011 | Breed | ............................. | 701/23 |
| 7,999,698 B2 * | 8/2011 | Annati et al. | ................ | 340/945 |
| 8,086,351 B2 * | 12/2011 | Gaudiano et al. | ............. | 700/253 |
| 8,210,467 B2 * | 7/2012 | Hubbell et al. | ................. | 244/13 |
| 8,265,800 B2 * | 9/2012 | Smith et al. | ....................... | 701/2 |
| 8,502,456 B2 | 8/2013 | Jarrell et al. | | |
| 8,716,942 B2 | 5/2014 | Jarrell et al. | | |
| 8,838,289 B2 * | 9/2014 | Margolin | .......................... | 701/2 |
| 8,886,459 B2 * | 11/2014 | Stefani et al. | ................. | 701/519 |
| 8,909,391 B1 * | 12/2014 | Peeters et al. | ..................... | 701/2 |

(Continued)

OTHER PUBLICATIONS

Clot, Andrew J., "Communications Command and Control—The crowded spectrum," Presented at the UT0 AVT Course on "Development and Operation of UAVs for Military and Civil Applications", held in Rhode-Saint-Genese, Belgium, Sep. 13-17, 1999, and published in RTO EN-9. [online], http://ftp.rta.nato.int/public/PubFulltext/RTO/EN/RTO-EN-009/EN-009-02B.pdf, [retrieved Jul. 22, 2014], 8 pagesq.

(Continued)

*Primary Examiner* — James Trammell
*Assistant Examiner* — Atul Trivedi
(74) *Attorney, Agent, or Firm* — Krenz Patent Law, LLC

(57) ABSTRACT

A computer-implemented method of communicating with an unmanned aerial vehicle includes transmitting a first message via a communications transmitter of a lighting assembly for receipt by an unmanned aerial vehicle. The first message includes an identifier associated with the lighting assembly, and the lighting assembly is located within a proximity of a roadway. The method also includes receiving a second message from the unmanned aerial vehicle via a communications receiver of the lighting assembly. The second message includes an identifier associated with the unmanned aerial vehicle. The method further includes transmitting a third message via the communications transmitter of the lighting assembly for receipt by the unmanned aerial vehicle. The third message includes an indication of an altitude at which the unmanned aerial vehicle should fly.

30 Claims, 7 Drawing Sheets

(56) References Cited

U.S. PATENT DOCUMENTS

| | | | |
|---|---|---|---|
| 2003/0234730 A1* | 12/2003 | Arms et al. | 340/870.01 |
| 2006/0026017 A1* | 2/2006 | Walker | 705/1 |
| 2006/0074557 A1* | 4/2006 | Mulligan et al. | 701/213 |
| 2006/0167597 A1* | 7/2006 | Bodin et al. | 701/3 |
| 2007/0129855 A1 | 6/2007 | Coulmeau | |
| 2008/0119965 A1* | 5/2008 | McCrary | 701/2 |
| 2010/0145610 A1 | 6/2010 | Bacabara et al. | |
| 2010/0250022 A1* | 9/2010 | Hines et al. | 701/2 |
| 2011/0130636 A1* | 6/2011 | Daniel et al. | 600/301 |
| 2011/0208373 A1* | 8/2011 | Lees et al. | 701/2 |
| 2013/0206922 A1 | 8/2013 | Riedinger et al. | |
| 2014/0022051 A1* | 1/2014 | Levien et al. | 340/5.2 |
| 2014/0032034 A1* | 1/2014 | Raptopoulos et al. | 701/25 |
| 2014/0172727 A1* | 6/2014 | Abhyanker et al. | 705/307 |
| 2014/0332620 A1* | 11/2014 | Earon | 244/13 |

OTHER PUBLICATIONS

DeGarmo, Matthew T., "Issues Concerning Integration of Unmanned Aerial Vehicles in Civil Airspace," The Mitre Corporation, Center for Advanced Aviation System Development, McLean, Virginia, Mitre Product, MP 04W0000323 [online], https://www.mitre.orgsites/default/files/pdf/04_1232.pdf, Nov. 2004, 98 pages.

* cited by examiner

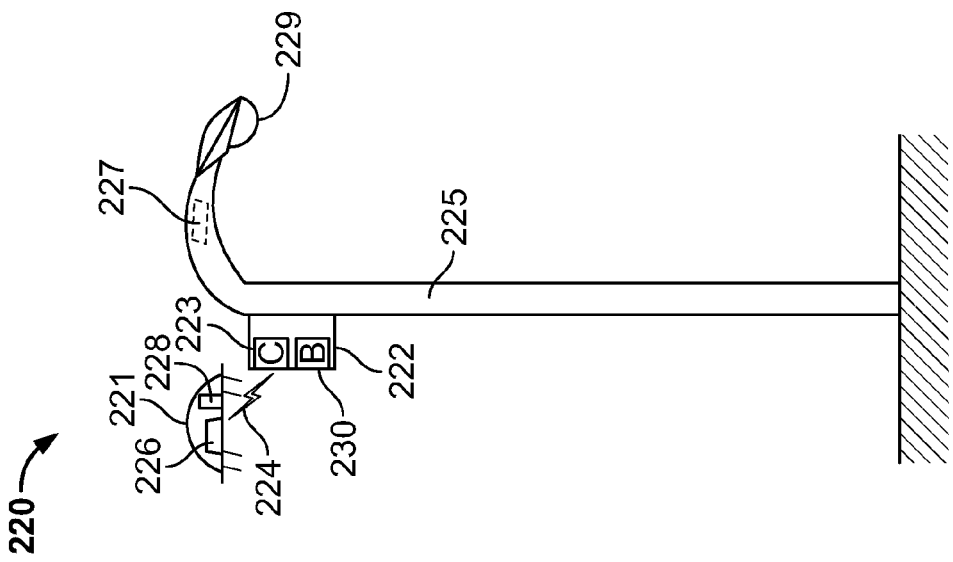
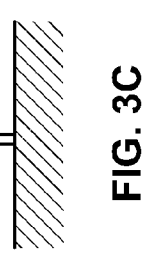
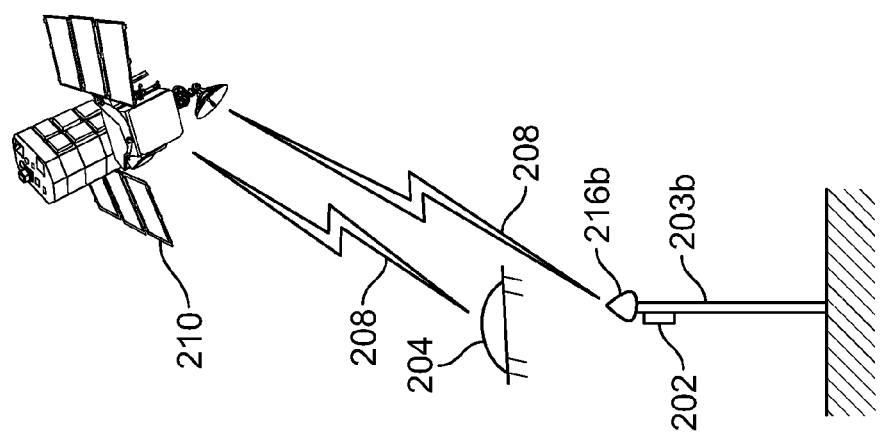
FIG. 4
FIG. 3C
FIG. 3B

UNMANNED AERIAL VEHICLE COMMUNICATION, MONITORING, AND TRAFFIC MANAGEMENT

CROSS-REFERENCE TO RELATED APPLICATION

This application claims the benefit of U.S. Provisional Application No. 62/024,197, filed Jul. 14, 2014, the entire contents of which are incorporated in its entirety herein.

TECHNICAL FIELD

This document generally describes methods, systems and devices for communicating with unmanned aerial vehicles, monitoring unmanned aerial vehicles, and for managing air traffic for unmanned aerial vehicles.

BACKGROUND

Unmanned aerial vehicles, sometimes referred to as unmanned aircraft or "drones," are aircraft that fly without a human pilot onboard the aircraft. In some cases, the unmanned aerial vehicle is controlled, operated or piloted in real time by a human via a ground-based control system. In some cases, the unmanned aerial vehicle is supervised, but is not piloted, in real time by a human operator via a ground-based monitoring system. In some cases, the unmanned aerial vehicle includes navigational instrumentation and control circuitry that permit the unmanned aerial vehicle to navigate in real time without the aid of a human operator, so that the unmanned aerial vehicle is able to autonomously control its flight without the aid of a human operator in real time.

Unmanned aerial vehicles have been used in military operations, such as military surveillance, combat, and reconnaissance operations. Additionally, unmanned aerial vehicles have been proposed that would deliver books or other commercially ordered products to a customer's residence.

Public opinion has generally been supportive of the use of unmanned aerial vehicles for military surveillance, combat, and reconnaissance operations carried out internationally, but when it comes to domestic applications—whether for military, civil, or commercial uses—public opinion has been less enthusiastic. For example, privacy concerns have been raised regarding unauthorized or intrusive surveillance opportunities that could arise as unmanned aerial vehicles become more prevalent. Moreover, concerns have been raised related to the potential for injury or property damage that could be caused by unmanned aerial vehicles, or that operation of unmanned aerial vehicles proximate one's private property or residence would be an unwelcome nuisance.

SUMMARY

In a first general aspect, a computer-implemented method of communicating with an unmanned aerial vehicle includes transmitting a first message via a communications transmitter of a lighting assembly for receipt by an unmanned aerial vehicle. The first message includes an identifier associated with the lighting assembly, and the lighting assembly is located within a proximity of a roadway. The method also includes receiving a second message from the unmanned aerial vehicle via a communications receiver of the lighting assembly. The second message includes an identifier associated with the unmanned aerial vehicle. The method further includes transmitting a third message via the communications transmitter of the lighting assembly for receipt by the unmanned aerial vehicle. The third message includes an indication of an altitude at which the unmanned aerial vehicle should fly.

Various implementations may include one or more of the following. The indication of the altitude at which the unmanned aerial vehicle should fly may include an identifier of an air corridor having associated therewith a predetermined minimum altitude and a predetermined maximum altitude. The method may also include determining, via a computation unit of the lighting assembly, an altitude of the unmanned aerial vehicle, and the third message may include the altitude of the unmanned aerial vehicle. The identifier associated with the unmanned aerial vehicle may include a location indicator of the unmanned aerial vehicle, and determining the altitude of the unmanned aerial vehicle may be based on the location indicator of the unmanned aerial vehicle and on a location identifier of the lighting assembly. The identifier associated with the lighting assembly may include a location identifier of the lighting assembly. The location identifier of the lighting assembly may include one or more GPS coordinates associated with the lighting assembly. The roadway may be associated with a right-of-way, and the identifier associated with the lighting assembly may include a location indicator associated with the right-of-way. The identifier associated with the unmanned aerial vehicle may include a location indicator of the unmanned aerial vehicle, and the method may further include determining that the unmanned aerial vehicle is outside of an airspace associated with the right-of-way, and the third message may include a warning that the unmanned aerial vehicle is outside of the airspace associated with the right-of-way. The first message may include an indication of a landing area. The first message may include a location identifier associated with an obstacle. The method may further include storing in a memory location of the lighting assembly the identifier associated with the unmanned aerial vehicle and a time stamp. The method may further include transmitting a fourth message via the communications transmitter of the lighting assembly for receipt by a control center remote from the lighting assembly, where the fourth message includes the identifier associated with the unmanned aerial vehicle and the time stamp. The message may further include transmitting, from a charging unit of the lighting assembly, a wireless charging signal for receipt by the unmanned aerial vehicle for charging a battery of the unmanned aerial vehicle. The method may further include transmitting a fourth message via the communications transmitter of the lighting assembly, the fourth message including the identifier associated with the unmanned aerial vehicle and a quantity associated with the wireless charging signal. Each of the first message, the second message, and the third message may be encrypted for security. Each of the first message the second message, and the third message may include a security question. The identifier associated with the unmanned aerial vehicle may include a location indicator of the unmanned aerial vehicle, and the method may further include determining that the unmanned aerial vehicle is within a predetermined distance of a second unmanned aerial vehicle based on the location indicator of the unmanned aerial vehicle and on information received from the second unmanned aerial vehicle, and the third message may include a warning that the unmanned aerial vehicle is within the predetermined distance of the second unmanned aerial vehicle. The method may further include determining a navigational adjustment for the unmanned aerial vehicle, and the third message may include the navigational adjustment for the unmanned aerial vehicle. The first message may include an indication of weather, or may include an indication of a speed. The method may further include determining a speed of the unmanned aerial vehicle. The speed of the unmanned aerial vehicle may exceed a predetermined speed threshold, and the method may further include transmitting a fourth message that includes an indication of the speed of the unmanned aerial vehicle. The first message may include an indication of a noise level, or may include an indication of an emissions level. The identifier associated with the unmanned aerial vehicle may include license or registration information for the unmanned aerial vehicle, and the method may further include determining whether the license or registration information for the unmanned aerial vehicle is valid. The method may further include determining that the unmanned aerial vehicle includes a weapon. The first message may include an indication of an area that the unmanned aerial vehicle should avoid.

In a second general aspect, a lighting assembly includes a light pole located within a proximity of a roadway, and a luminaire. The lighting assembly also includes a communications station associated with the lighting assembly. The communications station includes a communications transmitter configured to transmit a first message for receipt by an unmanned aerial vehicle, where the first message includes an identifier associated with the lighting assembly. The communications station also includes a communications receiver configured to receive a second message from the unmanned aerial vehicle, where the second message includes an identifier associated with the unmanned aerial vehicle. The communications station further includes a processing module configured to determine an altitude at which the unmanned aerial vehicle should fly. The communications transmitter is further configured to transmit a third message for receipt by the unmanned aerial vehicle, where the third message includes an indication of the altitude at which the unmanned aerial vehicle should fly.

Various implementations may include one or more of the following. The indication of the altitude at which the unmanned aerial vehicle should fly may include an identifier of an air corridor having associated therewith a predetermined minimum altitude and a predetermined maximum altitude. The processing module may further be configured to determine an altitude of the unmanned aerial vehicle, and the third message may include the altitude of the unmanned aerial vehicle.

BRIEF DESCRIPTION OF THE DRAWINGS

FIGS. 3A, 3B, and 3C are conceptual diagrams of example communication styles that an example communications station can use to communicate with an example unmanned aerial vehicle.

FIG. 4 is a conceptual diagram that depicts an example unmanned aerial vehicle receiving a charging signal from an example communications station.

Like reference symbols in the various drawings indicate like elements.

DETAILED DESCRIPTION

Figure 1:
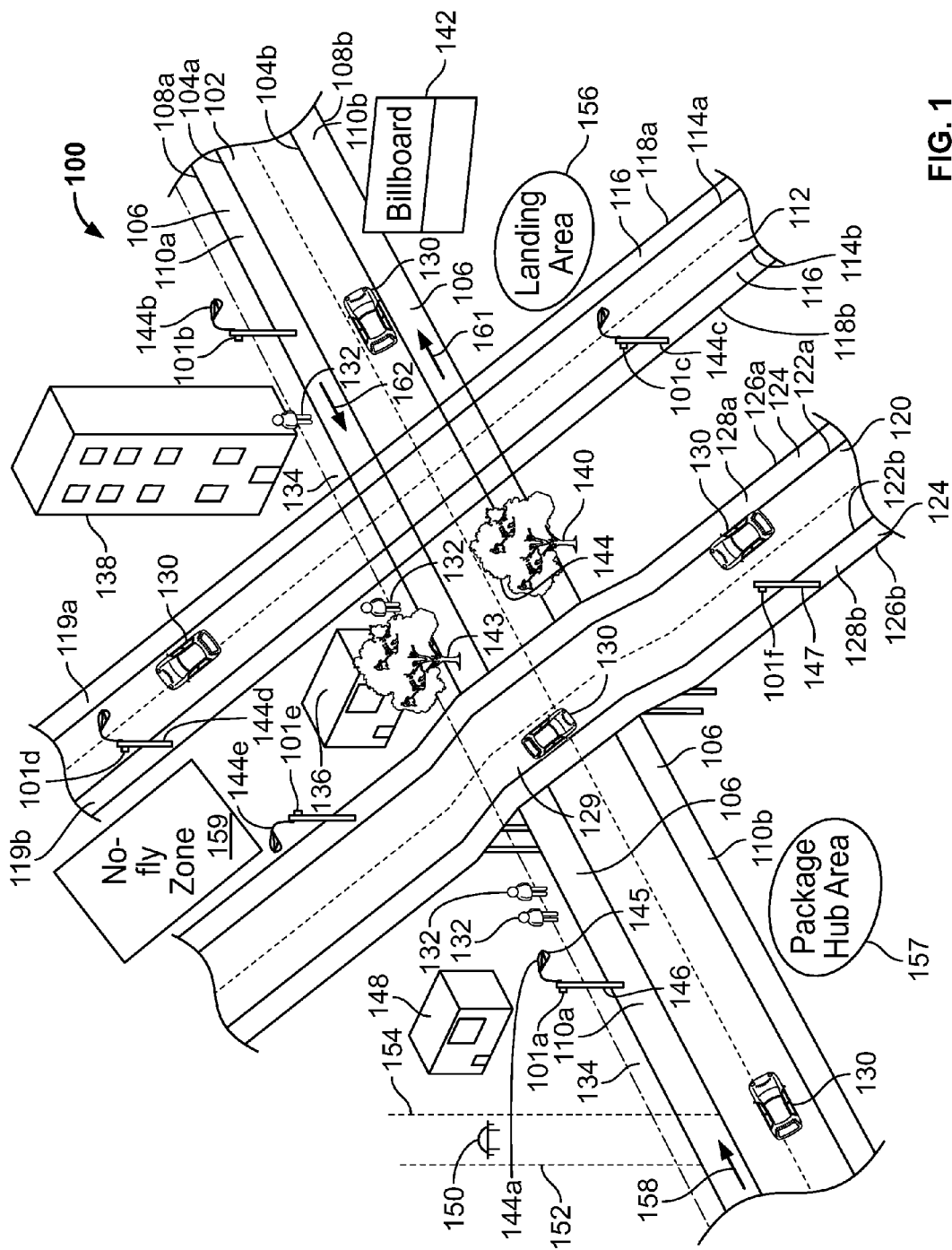
FIG. 1 is a conceptual diagram of an example unmanned aerial vehicle flight environment and an example system for communicating with unmanned aerial vehicles operating within the environment.

Described herein are systems, devices and methods that can be used, according to some implementations, for one or more of providing communications with unmanned aerial vehicles, providing information to- and receiving information from unmanned aerial vehicles, aiding unmanned aerial vehicles, logging, chronicling or validating routes of unmanned aerial vehicles, managing aspects of unmanned aerial vehicle traffic, alleviating, reducing, or mitigating privacy concerns associated with unmanned aerial vehicles, checking or validating registration or license information for unmanned aerial vehicles, improving reliability of unmanned aerial vehicle operations, sensing or monitoring for unmanned aerial vehicles, and improving public safety conditions associated with unmanned aerial vehicle operations. In general, the techniques, systems and devices discussed herein may be used with any type of unmanned aerial vehicle, drone, unmanned aircraft, remotely piloted or remotely operated aircraft, or unmanned aircraft system, without limitation. For simplicity, the examples discussed herein will generically refer to unmanned aerial vehicles.

Unmanned aerial vehicles ("UAVs") are aircraft that fly without a human pilot onboard the aircraft, and have been used for many different purposes. While military-grade UAVs have long existed for carrying out military operations or special operations applications, it is expected that general-purpose UAVs may become increasingly common in day-to-day life. For example, UAVs may be used for various civil applications (e.g., police departments, fire departments, search and rescue departments, disaster response), recreational applications, commercial applications, or other applications in the future. As one example of a potential future commercial use, some businesses have considered using UAVs to perform delivery functions currently being performed by ground-based delivery personnel who deliver goods via car, truck, bicycle, or by foot. Such deliveries may be from a retailer or warehouse location to a consumer's residence, for example, or from a retailer or warehouse to another business (related to a business-to-business transaction).

Unmanned aerial vehicles typically use aerodynamic forces to provide lift and permit the aircraft to achieve flight. Some UAVs include one or more fixed wings; some UAVs include one or more rotary blades or rotors; and some UAVs include both one or more fixed wings and one or more rotary blades or rotors. Some UAVs can takeoff and land without direct human assistance, while others require some form of human assistance, for example to assist in lifting off or taking flight initially. Some UAVs are gas (or other type of fuel) powered, while others are battery powered. Some UAVs are powered by a combination of gas- or fuel power and battery power.

UAVs can have many shapes, sizes, styles, and levels of complexity. Military-grade UAVs have tended to be large, complex and expensive, and have been equipped to fly for long distances without refueling or recharging. For example, some versions of the Predator drone are 27 ft. long with wingspans of nearly 50 ft., have a payload capacity of over 1000 lbs., weigh over 2000 lbs. when loaded, have a flight range of nearly 700 miles, and have a unit cost of about $4 million. It is expected that many UAVs to be used for commercial or other purposes, by contrast, will be much smaller, simpler, less expensive, and have a much smaller flight range. For example, some versions of an "octocopter" UAV, which includes eight small rotors, are about the size of some traditional remote-controlled airplanes, are battery powered, have a payload capacity of about five pounds, and have a flight range of about ten miles. Other delivery UAVs have been proposed that would have a payload capacity of up to 55 lbs., and a somewhat longer flight range.

Traditionally, UAVs have been controlled or piloted in real time by a ground-based operator, who controls or partially controls the UAV using a ground-based control system. Communications between the ground-based control system and the UAV can occur over one or more wireless datalinks or communication paths. In some cases, the communication signals can include one or more video channels or feeds. In some examples, satellite communications can be used, where communications from the ground-based control system to the UAV, and vice versa, pass though one or more orbiting satellites. Alternatively, communications from the ground-based control system to the UAV, and vice versa, may pass over one or more networks or communication links, such as one or more cellular or other phone-based networks, over remote control radio frequency links, UHF or L-band frequency links, microwave frequency links, or other appropriate datalinks, networks, or communication paths.

Some UAVs are equipped with autopilot functionality to autonomously control their flight using one or more onboard computers and associated sensors and other navigational instrumentation and control circuitry. Autonomously controlled UAVs typically receive positional updates via received Global Positioning System ("GPS") signals. However, some types of GPS and other satellite-based communications can be susceptible to poor weather conditions, can be restricted to areas that have a line-of-sight to an appropriate satellite, or can be susceptible to jamming, spoofing, or hacking attacks. In some examples, UAVs that fly autonomously send and/or receive information over one or more wireless datalinks, networks, or communication paths such as, for example, one or more of the datalinks, networks or communication links discussed above. In some examples, combinations of the foregoing communications methods can be used.

FIG. 1 is a conceptual diagram of an example unmanned aerial vehicle flight environment 100, and an example system for communicating with unmanned aerial vehicles operating within (or outside of) the environment 100. The environment 100 may represent, without limitation, a portion of a town, city, or metropolitan area, for example. In general, communications stations 101 (e.g., stations 101a, 101b, 101c, 101d, 101e, 101f), which may be positioned on streetlights, traffic lights, utility poles, towers (e.g., cell towers), communications station poles, road signs or display monitors, buildings, trees, billboards, bridges, or other structures within a proximity of a roadway or a right-of-way, according to various implementations, can be used to communicate with UAVs. In various implementations, the communications stations 101 may also provide information to- and receive information from UAVs, aid UAVs, log, chronicle or validate routes of UAVs, manage aspects of UAV traffic, alleviate, reduce, or mitigate privacy concerns associated with UAVs, check or validate registration information for UAVs, sense or monitor for UAVs, improve reliability of UAV operations, and improve public safety conditions associated with UAV operations.

A roadway 102 is bounded by a first roadway edge 104a and a second roadway edge 104b, and is associated with a right-of-way 106, which is defined by a first right-of-way boundary 108a and a second right-of-way boundary 108b. In some examples, the right-of-way 106 (and other right-of-ways discussed later herein) may be a public right-of-way. In some examples, the right-of-way 106 (and other right-of-ways discussed later herein) may be a legal right-of-way. In the depicted example, the roadway 102 is located within the right-of-way 106, and is roughly centered between the boundaries 108a, 108b of the right-of-way 106. In some examples, the roadway 102 may have a width (e.g., distance between edges 104a and 104b) of about 24-32 feet for a two-lane roadway, and the right-of-way 106 may have a width (e.g., distance between boundaries 108a and 108b) of about 35-60 feet, for example. For simplicity, roadway 102 is depicted in FIG. 1 as a two-lane highway or road, but in other examples could have more (e.g., three, four, five, six, seven, eight, nine, ten, eleven, twelve, or more) or fewer (e.g. one or zero) lanes, and could be an interstate highway, a federal or state highway, a county road, a city street, or the like. Roadway 102 may have any appropriate width, and right-of-way 106 may similarly have any appropriate width. In some examples, roadway 102 is contained within right-of-way 106, but in some examples one or more portions of roadway 102 may extend outside of right-of-way 106.

The first right-of-way boundary 108a and the first roadway edge 104a define a first right-of-way zone 110a therebetween, and the second right-of-way boundary 108b and the second roadway edge 104b define a second right-of-way zone 110b therebetween. As one example, for the two-lane roadway 102, roadway 102 may have a width of about 32 ft., and right-of-way 106 may have a width of about 60 ft. Roadway 102 may generally be centered within the right-of-way 106, so that the first right-of-way zone 110a has a width of about 14 ft. and the second right-of-way zone 110b has a width of about 14 ft. As will be described in more detail below, some implementations of the systems, devices and methods discussed herein can facilitate UAV traffic in the airspace or airspaces above one or more of the first right-of-way zone 110a and the second right-of-way zone 110b (or above other right-of-ways or right-of-way zones).

The environment 100 also depicts a second roadway 112, bounded by roadway edges 114a and 114b, and a second right-of-way 116, defined by boundaries 118a and 118b. Right-of-way zones 119a and 119b are defined between roadway edge 114a and boundary 118a, and between roadway edge 114b and boundary 118b, respectively. The environment 100 similarly depicts a third roadway 120, bounded by roadway edges 122a and 122b, and a second right-of-way 124, defined by boundaries 126a and 126b. Right-of-way zones 128a and 128b are defined between roadway edge 122a and boundary 126a, and between roadway edge 122b and boundary 126b, respectively. The third roadway 120 includes a bridge 129.

Several cars or trucks 130 are shown driving on the roadways 102, 112, and 120, and several pedestrians 132 are depicted walking on a sidewalk 134. In some examples, the pedestrians may be approaching or departing from a retail store 136 or an office building 138. A tree 140 and a billboard 142 are depicted, and in this example are located just outside of the second right-of-way zone 110b. Some of the branches and leaves 144 of the tree 140 protrude into the airspace above right-of-way-zone 110b, as can be seen with reference to FIG. 1. Billboard 142 is located near the second right-of-way zone 110b, in the depicted example. Another tree 143 is located in first right-of-way zone 110a in the depicted example.

A first lighting assembly 144a is located within a proximity of a roadway (e.g., roadway 102 in the depicted example) or of a right-of-way (e.g., right-of-way 106 in the depicted example), or both. In this example, lighting assembly 144a is a streetlight, and includes a luminaire 145 and a pole 146 (e.g., a light pole in this example). A communications station 101a is associated with the lighting assembly 144a, and in the depicted example is attached to the lighting assembly 144a. For example, the communications station 101a can be attached to the light pole 146.

In various implementations, the communications station 101a can communicate with a UAV 150 operating in the environment 100. In some examples, a communications station 101 may communicate with UAVs 150 as they fly in the environment 100, such as when the UAV 150 flies in a vicinity or within communications range of the communications station 101. In various implementations, the communications station 101a may broadcast a first message that includes an identifier associated with the communications station 101a, with the first lighting assembly 144a, or with both the communications station 101a and the first lighting assembly 144a. The UAV 150 may receive the first message from the communications station 101a, and may transmit a second message that includes an identifier associated with the UAV 150, which may be received by the communications station 101a. In various implementations, the communications station 101a may transmit a third message, for receipt by the UAV 150, that includes an indication of an altitude at which the UAV 150 should fly, as will be discussed in more detail below.

In some examples, a UAV 150 may communicate with a first communications station when it is in a vicinity of the first communications station, and may communicate with a second communications station when it is in a vicinity of the second communications station. For example, a second lighting assembly 144b is also located within a proximity of the roadway 102 (and the right-of-way 106 in this example), and a communications station 101b is associated with the lighting assembly 144b (attached to the lighting assembly 144b in this example). As the UAV 150 flies in a direction 158, for example, the UAV 150 may communicate with communications station 101a while in a vicinity of the communications station 101a, and may communicate with communications station 101b while in a vicinity of the communications station 101b.

In some examples, a handoff of the UAV 150, communications-wise, from the first communications station 101a to the second communications station 101b can be executed. For example, as the UAV 150 flies in direction 158 away from the first communications station 101a and towards the second communications station 101b, one or more of communications station 101a or 101b may determine that communications station 101b should assume a larger communications role with the UAV 150, and/or that communications station 101a should assume a smaller communications role with the UAV 150 (or both). In some examples, this determination can occur at or about the time that the UAV 150 reaches a location that is closer to the second communications station 101b than to the first communications station 101a. In some examples, the UAV 150 may communicate with both communications station 101a and communications station 101b. In some examples, one or more of the communications stations 101a or 101b may inform the UAV 150 which of the communications stations 101a or 101b may be considered a primary communications station for the UAV 150, for example at a given time. In some examples, the UAV 150 may make a determination as to which of the communications stations 101a or 101b it will communicate with or will primarily communicate with (e.g., based on signal strengths of received signals from one or more of the stations, based on flight route and station locations, based on current or expected UAV location, or other factors).

Third lighting assembly 144c is located within a proximity of roadway 112 and right-of-way 116, and a communications station 101c is associated with the lighting assembly 144c (attached to the lighting assembly 144c in this example), and fourth lighting assembly 144d is similarly located within a proximity of roadway 112 and right-of-way 116, and a communications station 101d is associated with the lighting assembly 144d (attached to the lighting assembly 144d in this example). Fifth lighting assembly 144e is located within a proximity of roadway 120 and right-of-way 124, and a communications station 101e is associated with the lighting assembly 144e (attached to the lighting assembly 144e in this example). A pole 147 is also located within a proximity of roadway 120 and right-of-way 124, and a communications station 101f is associated with the pole 147. In some examples, pole 147 is a utility pole. In some examples, pole 147 is a communications or communications station pole.

As the UAV 150 proceeds along its flight path, it may communicate with communications stations (e.g., one or more of communications stations 101a, 101b, 101c, 101d, 101e, and 101f) along the way. In some examples, the particular communications station can initiate communications with the UAV 150. In some examples, the UAV 150 can initiate communications with the particular communications station.

In various implementations, the communications stations 101 may provide altitude information to the UAV 150. For example, a communications station 101 may provide an indication of altitude to the UAV 150. In various implementations, the indication of altitude may include an altitude that the UAV 150 is currently flying at. In some examples, the communications station 101 includes one or more sensors that the communications station 101 can use to determine an altitude that the UAV 150 is flying at. In some examples, the communications station 101 can determine the altitude based on information that is included in a message received by the communications station 101 from the UAV 150. For example, the message received from the UAV 150 may include a location identifier (e.g., one or more GPS coordinates or one or more latitude/longitude/elevation indications) that provides an indication of an altitude of the UAV 150. In some examples, the communications station 101 can determine the altitude based on a location indicator of the unmanned aerial vehicle and on a location identifier associated with the lighting assembly or communications station (e.g., one or more GPS coordinates or elevation or altitude indications for the lighting assembly or communications station).

In some examples, the indication of an altitude can include an altitude or an altitude range that the UAV 150 should fly at, or an identifier of an air corridor in which the UAV 150 should fly, as will be further described below. In some implementations, the communications station 101 may provide an indication of an altitude, an altitude range, or of one or more air corridors that the UAV 150 should avoid flying at or in.

Other information that can be provided by the communications station 101 to the UAV 150 can include indications of one or more obstacles that the UAV 150 may encounter during its flight, or that the UAV 150 should avoid during its flight. For example, the communications station 101 may provide the UAV 150 with an indication of the office building 138 or of the retail store 136, of the trees 140 or 143, or of the branches 144 that protrude into the airspace of the right-ofway 110b, of the billboard 142, of the bridge 129, of utility poles or power lines, traffic lights, construction equipment (e.g., large cranes), mountains or hills, or of other obstacles or impediments that the UAV 150 should avoid during its flight. In some examples, the indications of obstacles can include a location identifier (e.g., one or more GPS coordinates or one or more latitude/longitude indications or latitude/longitude/elevation indications) associated with the corresponding obstacle.

In some examples, the communications station 101 can provide an indication of a landing area 156 (e.g., an emergency landing area or safe landing area) where it may be safe for the UAV 150 to land should the UAV 150 need to make an unscheduled landing. In some examples, the indication of the landing area can include a location identifier (e.g., one or more GPS coordinates or one or more latitude/longitude or latitude/longitude/elevation indications) associated with the landing area 156. In some examples, the indication of the landing area can include directions to the landing area 156 based on a current location or position of the UAV 150. In some implementations, landing area 156 can include one or more charging stations, and a UAV 150 may use one of the charging stations to recharge one or more batteries of the UAV. In some examples, landing area 156 or a portion of landing area 156 may overlap a portion of a right-of-way (e.g., right of way 106) or may overlap a portion of a right-of-way zone (e.g., zone 110b).

In some examples, the communications station can provide an indication of a package hub area 157, which may correspond to a package pick-up or drop-off location or area, in various implementations. For example, in implementations where the UAV 150 is used to deliver packages, the communications station 101 may provide an indication of a package hub area 157 where one or more retailers may drop off merchandise or packages to be delivered by a delivery service or company that utilizes UAVs to deliver the merchandise or packages. In various implementations, the indication provided by the communications station 101 can include a location identifier (e.g., one or more GPS coordinates or one or more latitude/longitude or latitude/longitude/elevation indications) for the package hub area 157. In some implementations, the indication can include directions to the package hub area 157 based on a current location or position of the UAV 150. Package hub area 157 may include one or more warehouses (not shown in FIG. 1). In some examples, a single retailer may use the package hub area 157 to stage package delivery, and in some implementations, several retailers may use the package hub area 157 to stage package delivery. In some implementations, package hub area 157 can include one or more charging stations, and a UAV 150 may use one of the charging stations to recharge one or more batteries of the UAV. In some examples, package hub area 157 or a portion of package hub area 157 may overlap a portion of a right-of-way (e.g., right of way 106) or may overlap a portion of a right-of-way zone (e.g., zone 110b).

In some examples, the communications station 101 can provide an indication of weather to the UAV 150. For example, the communications station 101 may provide a localized (e.g., in the area of the communications station 101 or the UAV 150) indication of wind speed and/or wind direction, which the UAV 150 may use in some implementations to make navigational corrections. In some examples, the communications station 101 may provide indications of severe weather warnings or conditions. In various implementations the communications station 101 may be equipped with one or more sensors that can sense one or more weather conditions, and the communications station 101 can convey the one or more sensed weather conditions to the UAV 150, as by a wireless message, for example. In some examples, the communications station 101 may receive a message (e.g., from a remote weather station or weather service) that includes weather-related information, and the communications station 101 may transmit a message to the UAV 150 that includes the weather-related information. Examples of weather related information that can be conveyed from the communications station 101 to the UAV 150 can include, without limitation, wind speeds and wind directions, visibility levels, severe weather warnings, indications of lightning, indications of temperature, indications of humidity, or indications of hail, sleet, snow, or rain.

In some examples, the communications station 101 can provide the UAV 150 with an indication of one or more areas to avoid, or one or more no-fly zones where the UAV 150 may not be permitted to fly. Referring again to FIG. 1, a no-fly zone 159 is depicted. In some examples, the no-fly zone 159 may be a permanent no-fly zone, such as an area corresponding to an airport, a high security area (e.g., White House, Pentagon, military installation or base, or the like), or areas where UAVs may be unwelcome (e.g., near schools, near some businesses, near an athletic stadium, near an historic site). In some examples, the no-fly zone 159 may correspond to an area that is temporarily restricted due to a temporary condition or situation. Examples of such temporary conditions or situations can include, without limitation, natural disasters (e.g., earthquakes, tornados, hurricanes, typhoons, floods) or other weather-related conditions, emergencies (e.g., fires, accidents, police or emergency response situations, and the like), congested areas (e.g., congested due to UAV traffic, ground-based vehicle traffic, pedestrian traffic or gatherings, or the like), restricted areas, areas for which a threat has been identified or received, or areas associated with a temporary danger or cause for concern. In some cases, the communications station 101 can inform the UAV 150 of an alternate route to bypass the no-fly zone 159 or the one or more areas to avoid. In some examples, if a communications station 101 determines that a UAV 150 is flying in a no-fly zone 159, is flying within a predetermined distance of a no-fly zone 159, or appears to be on course towards a no-fly zone 159, the communications station 101 may transmit a warning message for receipt by the UAV 150. In some examples, upon such a determination, the communications station may transmit a warning message for receipt by one or more of a police or fire department, civil airspace authority, Federal Aviation Administration, a first responder, a security department, an owner of the UAV, or the like. In some examples, the communications station 101 may store an indication of the UAV 150 (e.g., an identification or registration number) in a memory location of the communications station 101. In some examples, the communications station 101 may issue a ticket or fine to a UAV that violates one or more of the no fly zone restrictions. In various implementations, the communications station 101 may transmit a message that includes information regarding the ticket or fine for receipt by one or more of the offending UAV, by a control center 148 remote from the communications station 101, by a police department, or by an owner or operator of the UAV. In some examples, the communications station 101 may store an indication of the ticket or fine in a memory location of the communications station 101.

In some examples, no-fly zones may be imposed during recurring periods of time, such as each day from 11:00 PM to 5:00 AM, or each day from 9:00 PM to 6:00 AM, or each day from 6:00 PM to 7:00 AM. For example, a city or local government may determine that there should not be UAV traffic during certain hours (e.g., hours during which a "UAV curfew" applies), and may impose a UAV no-fly zone over a large portion or all of the city during the appropriate times. Communications stations 101 may communicate such no-fly zone information (e.g., one or more of locations, times, and the like) to UAVs, according to some implementations.

In some examples, the communications station 101 can provide an indication of speed to the UAV 150. For example, in some implementations, the communications station 101 may determine a speed that the UAV 150 is flying at (e.g., a velocity of the UAV), and may provide an indication of the determined speed to the UAV 150. In some examples, the communications station 101 may include one or more sensors that can be used to determine a velocity of the UAV 150. In some examples, the communications station 101 may determine a velocity of the UAV 150 based on information received from the UAV 150. For example, if the UAV 150 provides an indication of its location in first and second messages from the UAV 150 to the communications station 101, the communications station 101 may calculate a distance travelled by the UAV 150 over a period of time (e.g., the time between messages), and may calculate the velocity by dividing the distance travelled by the period of time. In some examples, the time period between the two messages may be determined based on when the messages were received by the communications station 101, and in some examples may be determined based on information included with the messages, such as one or more time stamps.

In some examples, the communications station 101 may provide the UAV 150 with an indication of a speed limit, or of multiple speed limits (e.g., an upper limit and a lower limit), for an area proximate the communications station 101 or for an area that the UAV is flying in, flying towards, or destined for. The UAV may use this speed information to make appropriate adjustments to comply with the provided information, for example. In some implementations, speed limits at which UAVs may fly may vary throughout the environment 100. For example, the first communications station 101a may communicate one or more first speed limits when communicating with a UAV 150 based on prevailing speed limits for an area associated with the first communications station 101a (or with the first lighting assembly 144a), while the second communications station 101b may communicate one or more second speed limits (which may differ from the first speed limits) when communicating with the UAV 150 based on prevailing speed limits for an area associated with the second communications station 101b (or with the second lighting assembly 144b). In some examples, the communications station 101 may issue a speeding ticket or fine to a UAV that violates one or more of the speed limits or restrictions. In various implementations, the communications station 101 may transmit a message that includes information regarding the speeding ticket or fine for receipt by one or more of the offending UAV, by a control center 148 remote from the communications station 101, by a police department, or by an owner or operator of the UAV. In some examples, the communications station 101 may store an indication of the ticket or fine in a memory location of the communications station 101.

In some examples, the communications station 101 can provide an indication of a noise level or sound level to the UAV 150. For example, the communications station 101 may provide an indication of a maximum permissible noise or sound level associated with operation of the UAV. In some examples, the communications station 101 can provide an indication of an emissions level to the UAV 150. For example, the communications station 101 may provide an indication of a maximum permissible emissions level associated with operation of the UAV (e.g., for UAVs that are gas-powered or otherwise emit emissions). The UAV may use this noise or emissions information to make appropriate adjustments to comply with the provided information, for example. Similar to the speed limits discussed above, noise levels or emissions levels may vary for different areas, and different communications stations may communicate the levels associated with their particular area or location, for example. In some examples, the communications station 101 may issue a noise ticket or fine or an emissions ticket or fine to a UAV that violates one or more of the noise or emission limits or restrictions. In various implementations, the communications station 101 may transmit a message that includes information regarding the noise ticket or fine or the emissions ticket or fine for receipt by one or more of the offending UAV, by a control center 148 remote from the communications station 101, by a police department, or by an owner or operator of the UAV. In some examples, the communications station 101 may store an indication of the ticket or fine in a memory location of the communications station 101.

In some examples, the communications station 101 (or group of communications stations) can log, chronicle or validate a route of the UAV 150. For example, the communications station 101 may store, in a memory location of the communications station 101, one or more of an identifier associated with the UAV 150, an indication that the UAV 150 was in communication with the communications station 101, or an indication that the UAV 150 flew in a vicinity of the communications station 101. In some examples, the communications station 101 may store one or more time stamps or time indications along with one or more of the foregoing to establish the relevant time or times that the UAV 150 was interacting with or in a vicinity of the communications station 101. As the UAV 150 flies its route, for example, each communications station 101 (e.g., station 101a, 101b, 101c, 101d, 101e, 101f, or other stations, depending on route) along the route may log, chronicle or record an indication that the UAV 150 was in communication, for example, with the communications station 101, and optionally the time or times at which the communications occurred. In this manner, an unbiased and verifiable record of UAV flight patterns or activity may be collected and stored, which may validate that the UAV 150 flew its intended route, according to some implementations. Such records may be used to alleviate privacy concerns, for example, and may permit companies that use UAVs to provide proof that the UAVs operated as expected.

In some examples, a communications station 101 may transmit a message for receipt by a control center 148 remote from the lighting assembly 144 or communications station 101, where the message includes the identifier associated with the UAV, and optionally the time stamp. The control center 148 may aggregate such messages, which may be received by the control center 148 from one or more communications stations 101 (e.g., from all of the communications stations 101 within a city or within a portion of a city, region, neighborhood, or the like), for example, and may use the received messages to map flight paths or activities of the corresponding UAVs. Control center 148 is shown in environment 100, and in some examples a single control center 148 may communicate with all or substantially all of the communications stations within a city or region. In other examples, a city may include multiple control centers 148. In some examples, the UAV 150 may store one or more indications of its communications with one or more communications stations in a memory location on the UAV 150.

In some examples, one or more communications stations 101 may receive a message with information concerning a UAV and an expected route of the UAV. In some examples, such messages may be received from UAVs, and in some examples such messages may be received from a control center 148, or from a business that operates UAVs. The message may indicate an identifier for the UAV, and a time, time window, or time range during which the UAV is expected to be in a vicinity of, and/or in communication with, the communications station 101. The communications station 101 may monitor this time, time window, or time range, and if the UAV fails to communicate with the communications station 101 at the identified time or during the time window or time range, the communications station 101 may transmit one or more messages in response to the failure to communicate. For example, the communications station 101 may transmit a warning message to alert that the UAV has not been in contact with the communications station 101 at the expected time or during the expected time window or range. In some examples, one communications station may communicate with one or more other communications stations and attempt to locate the unaccounted-for UAV based on communications that may have been established between the one or more other communications stations and the unaccounted-for UAV.

In some examples, a communications station 101 can determine whether a UAV 150 has a valid or current registration or license. For example, the communications station 101 can request a registration or license identifier from the UAV 150, and can receive a message from the UAV 150 that includes a registration or license identifier of the UAV 150. In various implementations, the communications station 101 may compare the received registration or license identifier from the UAV 150 with a list of valid (or in some examples, invalid) registration or license identifiers, for example. In some examples, the communications station 101 may store a list of registration or license identifiers in a memory of the communications station 101, and may compare received registration or license identifiers with identifiers on the stored list. In some examples, the communications station 101 may determine validity or invalidity of the registration identifier based on the identifier itself or information or a designator or code within the identifier. In any of these or other manners, the communications station 101 may determine whether the received registration or license identifier is valid or invalid (e.g., expired), for example.

In some examples, the communications station 101, upon receiving the registration or license identifier from the UAV 150, may communicate with a control center 148 remote from the communications station 101, to authenticate or validate the registration or license identifier of the UAV 150, or to determine that the registration or license identifier is invalid. For example, the communications station 101 may transmit a message for receipt by the control center 148 that includes the received registration or license identifier from the UAV. The communications station 101 may then receive from the control center 148 a message that includes an indication (e.g., valid or invalid) regarding the registration or license identifier from the UAV 150. In some examples, the control center 148 may provide a list, and the communications station 101 may compare the UAV registration or license identifier to the list and make a determination regarding the UAV's compliance.

If the UAV 150 has an invalid registration or license, the communications station 101 may transmit a message to the UAV 150 informing the UAV 150 that it has an invalid registration or license, for example. In some cases, the communications station 101 can transmit a message for receipt by a communications device at police department (e.g., at a police station, police vehicle, or with a police officer) or civil airspace authority (or other appropriate authority), to inform that the UAV has invalid registration or license. In some examples, the communications station may issue a "ticket" or fine due to the expired or invalid registration or license. In various implementations, the communications station 101 may store an indication of the ticket or fine in a memory location of the communications station, may transmit a message for receipt by the UAV or by a police communications unit or civil airspace authority, or may transmit a message for receipt by a control center 148 or by a command station associated with the UAV (e.g., at a command station for the company that operates the UAV). Such tickets may also be issued by the communications station 101 for violations of speed limits, emissions levels, noise levels, no-fly zones, or for other infractions discussed herein.

In some cases, the communications station 101 can determine that the registration or license is currently valid, but that it will be expiring soon, and in such cases can transmit a message for receipt by the UAV 150 (or by a command station associated with the UAV) to inform the UAV 150 that its registration or license will be expiring soon. Such a message can include the date of expiration, for example.

Some implementations of the techniques, systems, and devices discussed herein can be used to promote, direct, or enforce UAV traffic management features, such as requiring, advising or providing information to assist UAVs to fly within particular airspaces. As one example, a communications station 101 can require, advise or provide information to a UAV 150 to assist that the UAV 150 flies in one or more particular air corridors, where in some examples an air corridor may refer to an airspace generally bounded laterally or horizontally (e.g., an airspace bounded to the left and to the right), and in some examples also bounded vertically (e.g., an airspace that includes a lower boundary, an upper boundary, or both lower and upper boundaries).

For example, a communications station 101 may provide a UAV 150 with information that instructs the UAV 150 to fly within one or more air corridors located above one or more of the right-of-way zones (e.g., zones 110a, 110b, 119a, 119b, 128a, and 128b) described above. Such air corridors may be bounded or defined, to the left or the right, by a boundary of a right-of-way or by an edge of a roadway (or by the airspace directly above the boundary or edge), for example, or in some cases may be bounded or defined by a predetermined lateral extension applied to a boundary of a right-of-way or an edge of a roadway (e.g., 2 ft., 5 ft., 10 ft., 15 ft., 20 ft., or some other appropriate lateral extension).

In some examples, the communications station 101 may provide the UAV 150 with location information associated with an air corridor, or with an airspace in which the UAV 150 should fly. For example, the communications station 101 may provide one or more GPS coordinates or other location indicators (e.g., latitude and longitude information, or latitude/longitude/elevation information) associated with one or more corridors (e.g., corresponding to a left or right boundary of the corridor, or corresponding to an upper or lower boundary of the corridor, or one or more combinations of the foregoing).

In some examples, the communications station 101 may provide the UAV 150 with positional information regarding a position or location of the UAV 150, or regarding a position or location of the UAV 150 with respect to an air corridor, to an air corridor boundary, to a right-of-way boundary, or to an airspace in which the UAV 150 should fly. For example, the communications station 101 may determine a position or location of the UAV 150 (e.g., either based on one or more sensor readings from one or more sensors of the communications station 101, or based on information provided by the UAV 150 in a message, for example), and may determine that the UAV 150 is not flying where it should be flying (e.g., outside of a particular air corridor or airspace in which the UAV 150 should be flying).

In some examples, the communications station 101 can send a message to the UAV 150 informing the UAV 150 that the UAV 150 is not flying in the particular air corridor or airspace in which the UAV 150 should be flying. In some examples, the communications station 101 can send a message to the UAV 150 that includes one or more positional or location identifiers, or one or more airspace identifiers, and the UAV 150 can use this information to adjust its route so that the UAV 150 may fly in a proper air corridor or airspace. In some examples, the communications station 101 can send a message to the UAV 150 that includes directions on how the UAV 150 should adjust its route so that the UAV may fly in the proper air corridor or airspace. In some examples, the communications station may issue a "ticket" or fine when the UAV flies outside of a prescribed area or an area that the UAV should be flying in (e.g., if the UAV is flying at the wrong altitude, in an incorrect altitude range, or in an incorrect air corridor). In various implementations, the communications station 101 may store an indication of the ticket or fine in a memory location of the communications station, may transmit a message for receipt by the UAV or by a police communications unit, civil airspace authority unit, or control center 148, or may transmit a message for receipt by a command station associated with the UAV (e.g., at a command station for the company that operates the UAV). In some examples, a communications station may hold, detain or restrict a UAV from proceeding until it assumes a proper altitude (e.g., within a proper altitude range or air corridor). For example, the communications station may send a message to the UAV that informs the UAV that it may not proceed on its route until the UAV begins to fly at a proper altitude, altitude range, or within a proper air corridor. If and when the UAV complies, the communications station may release its hold on the UAV (e.g., by sending a message to the UAV that informs the UAV it may proceed), and the UAV may proceed on its route.

Referring again to FIG. 1, the UAV 150 is located in an airspace associated with the right-of-way 106. In particular, the UAV 150 is flying in an airspace bounded laterally by the right-of-way boundaries 108a and 108b (e.g., by a vertical extension of the boundaries 108a and 108b). In the depicted example, the UAV 150 is additionally located in an airspace associated with the right-of-way zone 110a, and is flying in an airspace bounded laterally by the right-of-way boundary 108a and the roadway edge 104a (e.g., bounded by vertical extensions 152 and 154, respectively, of the boundary 108a and the roadway edge 104a).

The air corridors may further be bounded or defined, from above and below, by appropriate altitude levels, such as a predetermined minimum altitude level and a predetermined maximum altitude level. Example upper and lower altitude boundaries for the air corridors might be, for example: a first corridor with lower altitude boundary of 100 ft. and upper altitude boundary of 150 ft.; a second corridor with lower altitude boundary of 150 ft. and upper altitude boundary of 200 ft.; a third corridor with lower altitude boundary of 200 ft. and upper altitude boundary of 250 ft.; a fourth corridor with lower altitude boundary of 250 ft. and upper altitude boundary of 300 ft.; a fifth corridor with lower altitude boundary of 300 ft. and upper altitude boundary of 350 ft.; and a sixth corridor with lower altitude boundary of 350 ft. and upper altitude boundary of 400 ft., where each of the first through sixth corridors are bounded on the left by an airspace above right-of-way boundary 108a and on the right by an airspace above roadway edge 104a (or alternatively by an airspace above right-of-way boundary 108b).

In some examples, a single air corridor may be defined above a right-of-way zone (e.g., above zone 110a, 110b, 119a, 119b, 128a, or 128b), for example having upper and lower boundary 400 ft. and 100 ft., respectively. In some examples, one or more of the air corridors (e.g., the first, second and third corridors) may be reserved for UAV traffic in a first direction, and one or more of the air corridors (e.g., the fourth, fifth, and sixth corridors) may be reserved for UAV traffic in a second direction (e.g., a direction opposite of the first direction). As another example, the first, third and fifth corridors may be reserved for UAV traffic in a first direction, and the second, fourth, and sixth corridors may be reserved for UAV traffic in a second direction (e.g., a direction opposite of the first direction).

In some examples, the communications stations 101 may direct traffic or provide traffic management information such that all or substantially all UAV traffic in an airspace above a right-of-way zone travels in the same direction. In some examples, the communications stations 101 may direct traffic or provide traffic management information such that all or substantially all UAV traffic in an airspace associated with a right-of-way zone flows in a direction consistent with vehicular traffic near the right-of-way zone. Referring again to FIG. 1, for example, the communications stations 101 may direct traffic or provide traffic management information such that UAV traffic in a first direction 161 is confined to the airspace above right-of-way zone 110b, and that UAV traffic in a second (opposite) direction 162 is confined to the airspace above right-of-way zone 110a, where such UAV traffic in the directions 161 and 162 is consistent with the vehicular traffic in the traffic lanes of roadway 102 nearest the respective right-of-way zones 110a and 110b.

As described above, a given communications station 101 may be in communication with several UAVs 150 at a given time or during a given window of time. For example, the communications station 101a may maintain contact or communications with each of the UAVs 150 within a proximity of the communications station 101a, within a predetermined distance from the communications station 101a, within communications range of the communications station 101a, or for which the communications station 101a is the station nearest the UAV's location at a given time, according to various implementations. As such, in some implementations the communications station 101a may maintain or have visibility to the location or position of each of the UAVs 150 that the communications station 101a is in contact or in communication with at a given time or during a given window of time.

In some examples, the communications station 101a may determine that a first UAV is too close to a second UAV (e.g., within a predetermined distance of the second UAV, or vice versa), and may send a warning message to one or both of the first UAV and the second UAV. In some examples, the communications station 101a may determine one or more navigational adjustments for one or both of the first UAV and the second UAV, and may communicate the one or more navigational adjustments to the first UAV or the second UAV, or may communicate a first navigational adjustment to the first UAV and a second navigational adjustment to the second UAV. The first UAV, second UAV, or both UAVs may use the one or more navigational adjustments to alter a position or route, for example, to maintain a safe distance between the UAVs and/or avoid a collision between the UAVs. This may reduce collisions between UAVs and improve safety relating to UAV operating conditions, according to some implementations.

Figure 2:
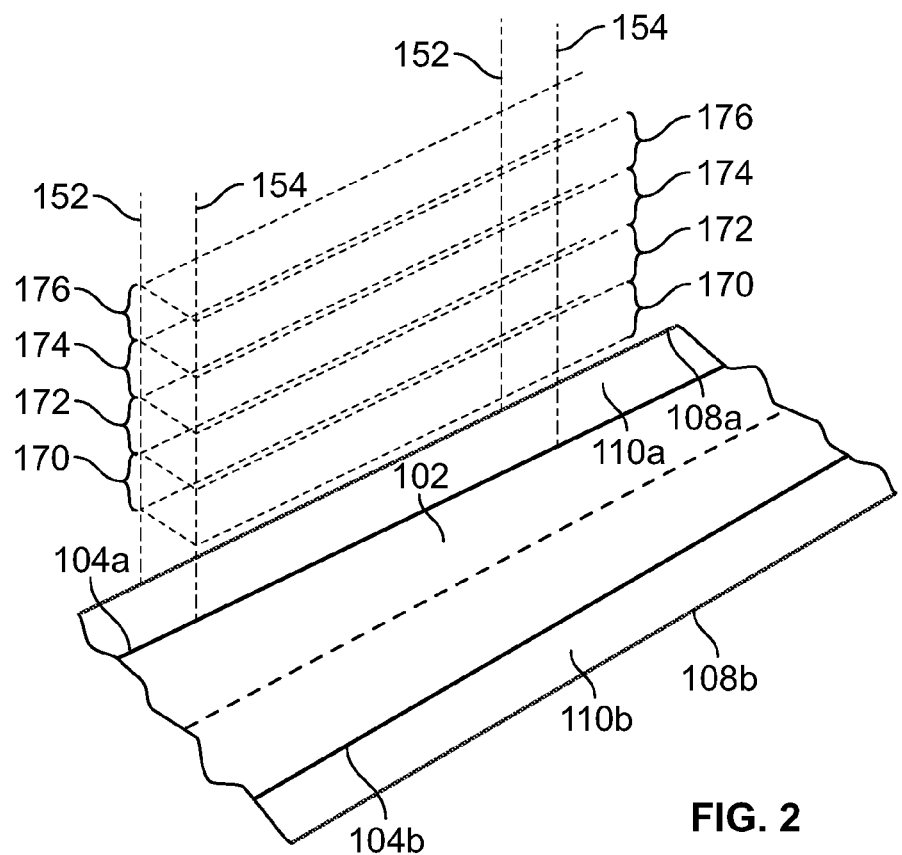
FIG. 2 is a conceptual diagram of example air corridors.

FIG. 2 is a conceptual diagram of example air corridors. Shown in FIG. 2 is the roadway 102 and right-of-way that includes right-of-way zones 110a and 110b of FIG. 1. Also shown from FIG. 1 are the vertical extensions 152 and 154, respectively, of the right-of-way boundary 108a and the roadway edge 104a. A first air corridor 170, located above right-of-way zone 110a in this example, is defined to have an example lower boundary altitude (e.g., a predetermined minimum altitude) of 100 ft. above ground and an example upper boundary altitude (e.g., a predetermined maximum altitude) of 175 ft. above ground; a second air corridor 172 is located directly above the first air corridor 170, and is defined to have an example lower boundary altitude of 175 ft. above ground and an example upper boundary altitude of 250 ft. above ground; a third air corridor 174 is located directly above the second air corridor 172, and is defined to have an example lower boundary altitude of 250 ft. above ground and an example upper boundary altitude of 325 ft. above ground; and a fourth air corridor 176 is located directly above the third air corridor 174, and is defined to have an example lower boundary altitude of 325 ft. above ground and an example upper boundary altitude of 400 ft. above ground. For simplicity, air corridors are depicted only above right-of-way zone 110a in FIG. 2, but similar air corridors may also be defined above right-of-way zone 110b, for example. The altitude boundary levels discussed herein are intended to be illustrative, and any appropriate altitude boundaries can be used for the air corridors. Also, while air corridors are described herein as located above right-of-way zones, it will be understood that the air corridors described herein may exist across the entire width of right-of-ways, above roadways, above combinations of the foregoing, above areas outside of right-of-ways, above areas adjacent to right-of-ways (e.g., areas outside of or included in a lateral extension of a right-of-way), above areas detached from a right-of-way, or above any appropriate area.

In some examples, the communications station 101 may transmit a message for receipt by the UAV 150 that includes an altitude at which the UAV 150 should fly. For example, the message may instruct the UAV 150 as to a particular air corridor in which that the UAV 150 should fly. In some examples, the message may instruct the UAV 150 to fly within an altitude range, for example within the altitude range of 200-300 feet above ground. In various implementations, the information included in the message from the communications station 101 includes an indicator of a right-of-way or of a right-of-way zone. In some examples, the information included in the message from the communications station 101 includes an indicator of a direction of travel.

The communications station 101 may make a determination regarding an appropriate air corridor or indicator of right-of-way or right-of-way zone, direction of travel, or altitude range based on local UAV traffic levels in some implementations, or based on one or more other factors including predetermined UAV flight patterns, weather conditions, the style or type of UAV, and others. In some examples, the communications station 101 may coordinate UAV traffic in an area proximate the communications station 101, for example in a manner analogous to how an air traffic controller coordinates aircraft traffic in a vicinity of an airport. In some examples, for each UAV that enters an area proximate the communications station 101 or for which the communications station 101 is responsible, the communications station 101 provides information regarding where the UAV should fly, for example.

By facilitating UAV traffic in airspace above right-of-way zones, in some implementations, safe and predictable operating conditions may be promoted. For example, UAVs generally restricted to flying above right-of-way zones may cause less damage if they lose control and crash within the right-of-way zones, as opposed to crashing on a roadway or in an area frequented by pedestrians, for example. Also, by facilitating UAV traffic according to particular air corridors, UAV traffic congestion may be better managed and potential for UAV collisions may be reduced or minimized, for example.

By facilitating or confining UAV traffic to or substantially to airspaces above right-of-ways or right-of-way zones for all or for a portion of a UAV's flight route, privacy concerns relating to UAVs may be reduced or alleviated, according to some implementations. For example, by restricting UAVs to generally fly in airspaces above such right-of-ways or above such right-of-way zones, the public may be less concerned about privacy invasion, intrusive surveillance, or potential for nuisance that might be caused by UAVs flying unregulated or without restriction regarding where the UAV may fly in relation to private residences or private property. It will be understood that, in general, for UAV flight routes, such as for UAVs making deliveries of packages to private residences or to businesses, or picking up or dropping off packages from package hub areas 157, or for other reasons, that the UAVs may have to fly above areas not associated with right-of-ways during a portion of the UAVs flight route.

In some examples, a communications station can operate as a UAV toll station. For example, a communications station can assess a toll on UAVs that fly within a particular airspace, such as within a particular air corridor. In various implementations, the communications station may store an indication of an identifier associated with the UAV, an optionally an indication of the toll, in a memory location of the communications station. In various implementations, the communications station may transmit a message that includes information regarding the toll for receipt by one or more of the UAV, by the control center 148 remote from the communications station, or by an owner or operator of the UAV.

In some examples, one or more of the air corridors may be an "express" corridor. For example, an owner or operator of a UAV may purchase a license or pass that may permit the UAV to fly in the designated express corridor, and the communications station may limit access to the express corridor to only those UAVs that have the license or pass to operate in the express corridor. If the communications stations determines that a UAV is flying in an express corridor without a license or pass that entitles the UAV to fly in the express corridor, the communications station may issue a ticket or fine in a manner similar to those discussed herein with reference other types of tickets or fines.

Figure 8:
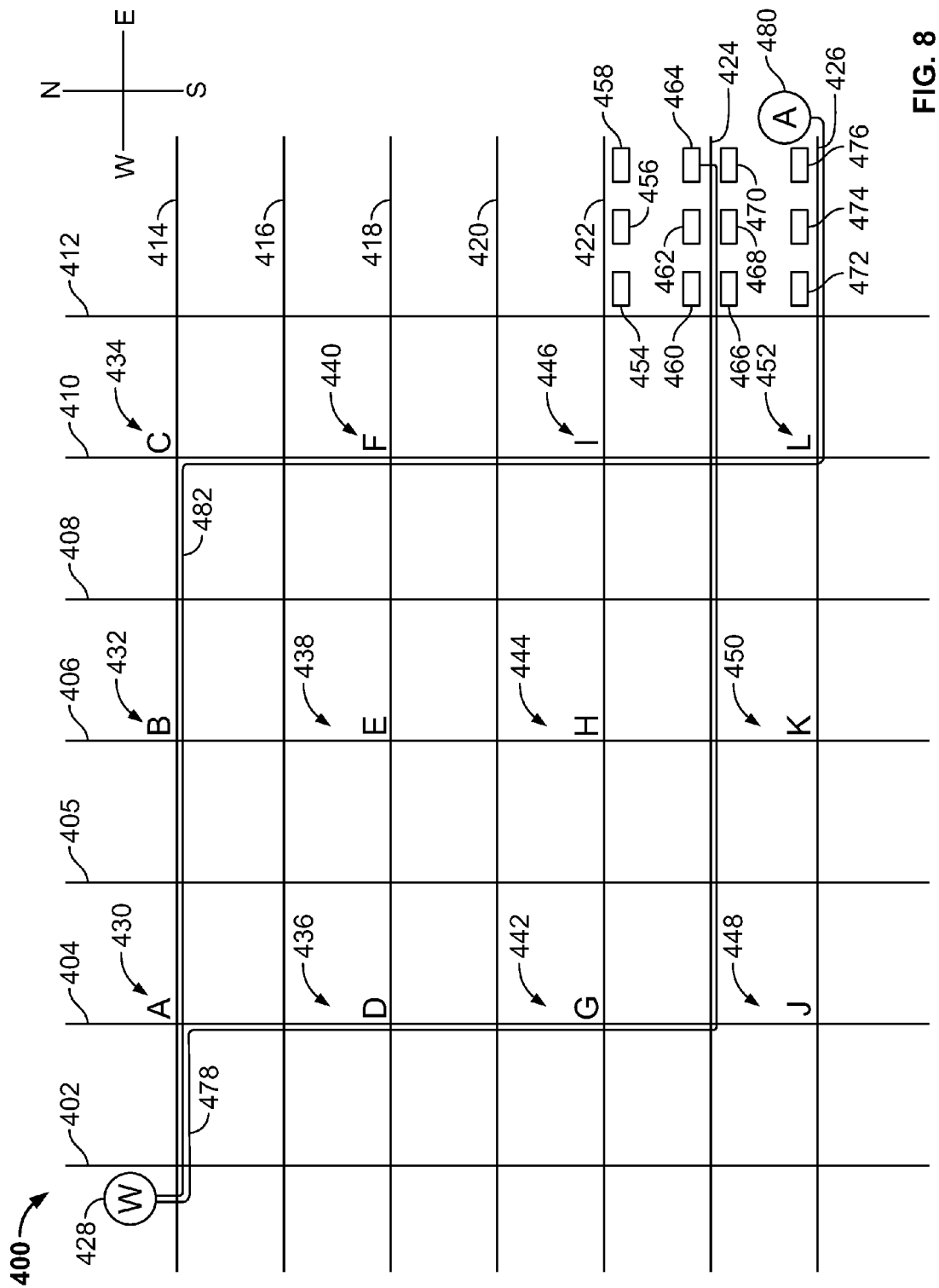
FIG. 8 is a conceptual diagram of an example unmanned aerial vehicle flight environment and an example system for communicating with unmanned aerial vehicles operating within the environment.

FIG. 8 is a conceptual diagram of an example unmanned aerial vehicle flight environment 400 and an example system for communicating with unmanned aerial vehicles operating within the environment. The environment 400 may represent, without limitation, a portion of a town, city, or metropolitan area, for example. The environment 400 includes a series of streets or roadways, where the streets or roadways may generally be located within rights-of-ways (e.g., within public rights-of-ways or legal-rights-of-ways, or both). For simplicity, roadways, right-of-ways, and one or more right-of-way zones associated with the roadway and/or the right-of-way are depicted as a single line in FIG. 8. North/south roadways/right-of-ways are depicted and represented by numerals 402, 404, 405, 406, 408, 410, and 412. Similarly, east/west roadways/right-of-ways are depicted and represented by numerals 414, 416, 418, 420, 422, 424, and 426. A warehouse 428 is located near the intersection of roadways/right-of-ways 402 and 414, and may represent a retail delivery departure location, for example, where UAVs may depart from warehouse 428 to deliver packages. Warehouse 428 may alternatively represent a delivery service provider, or a package hub area 157 (see FIG. 1). Twelve example communications stations: A 430, B 432, C 434, D 436, E 438, F 440, G 442, H 444, I 446, J 448, K 450, and L 452 are depicted in the environment 400. In various implementations, one or more of the communications stations 430-452 may be associated with a lighting assembly, such as a streetlight, a traffic light, a parking lot light, a message board, or the like, and may be attached to the lighting assembly in some examples. One or more of the communications stations 430-452 may be associated with a building, a billboard, a tree, a bridge, a tower, a utility pole, a communications pole, a road sign, or other structures. In some examples, the communications stations 430-452 may correspond to any of the communications stations (e.g., communications stations 101a-f, 202, 222, 252) discussed herein. Several residences 454, 456, 458, 460, 462, 464, 466, 468, 470, 472, 474, 476 (e.g., houses, apartments, townhouses, condominiums, or the like) are depicted in the environment 400.

In some examples, a UAV can follow a flight route 478 to deliver a package from the warehouse 428 to the residence 464. In general, route 478 begins at or near warehouse 428, crosses roadway/right-of-way 414, proceeds east until near the intersection of roadway/right-of-way 404 and roadway/right-of-way 414, turns south along roadway/right-of-way 404 and continues to near the intersection of roadway/right-of-way 404 and roadway/right-of-way 424, turns east along roadway/right-of-way 424, until arriving at residence 464 (e.g., crossing over roadway/right-of-way 424), where it may deliver the package.

As described above, the UAV may generally fly within airspaces associated with one or more of right-of-ways, right-of-way zones, roadways, or with any of the foregoing including lateral extensions to the right-of-ways, right-of-way zones, or roadways. In general, communications stations 430-452 may provide to the UAV any of the information described above herein with reference to FIGS. 1 and 2. The communications stations 430-452 may also collect information from the UAV as described herein. The communications stations 430-452 may provide information that instructs the UAV to fly in a particular airspace or air corridor, for example. The communications stations 430-452 may also log, chronicle, or record the route 478 of the UAV, or may record an indication of communications with the UAV or of the UAV's presence in a vicinity of the respective communications station, including an indication of the time or times that such communications occurred.

In some examples, communications station A 430 may establish communications with the UAV before the UAV departs from the warehouse 428, and may initially be the primary communications station for the UAV based on its proximity to the UAV's departure point as the UAV travels along its route 478. In some examples, communications station A 430 may remain the primary communications station for the UAV until the UAV reaches a location at or near the intersection of roadway/right-of-way 404 and roadway/right-of-way 416, where communications station D 436 may take over for communications station A 430 as the primary communications station for the UAV. In some examples, communications station D 436 may remain the primary communications station for the UAV until the UAV reaches a location at or near the intersection of roadway/right-of-way 404 and roadway/right-of-way 420, where communications station G 442 may take over for communications station D 436 as the primary communications station for the UAV.

In some examples, communications station G 442 may remain the primary communications station for the UAV until the UAV reaches a location at or near the intersection of roadway/right-of-way 404 and roadway/right-of-way 424, where communications station J 448 may take over for communications station G 442 as the primary communications station for the UAV. Alternatively, in some examples communications station G 442 may remain the primary communications station for the UAV until the UAV reaches a location at or near the intersection of roadway/right-of-way 405 and roadway/right-of-way 424, where communications station K 450 may take over for communications station G 442 as the primary communications station for the UAV. In some examples, communications station K 450 may remain the primary communications station for the UAV until the UAV reaches a location at or near the intersection of roadway/right-of-way 408 and roadway/right-of-way 424, where communications station L 452 may take over for communications station K 450 as the primary communications station for the UAV. In some examples, communications station L 452 may remain the primary communications station for the UAV while the UAV delivers its package to residence 464.

After making the delivery to residence 464, the UAV may return to the warehouse 428. In some examples, the UAV may return in the opposite direction along route 478, for example, and may generally communicate with the communications stations described above with reference to route 478. In some examples, the UAV follows a similar route to route 478, but flies on the opposite sides of the roadway/right-of-ways as compared to the above-described and depicted route 478 in FIG. 8, so as to be flying in generally the same direction as the nearest ground-based traffic lane. So, for example, on its return flight from residence 464 to warehouse 428, the UAV may fly along the north side of roadway/right-of-way 424, along the east side of roadway/right-of-way 404, and along the north side of roadway/right-of-way 414, while generally still following route 478, for example.

In some examples, one or more residences may be associated with an aggregate delivery area 480 (labeled "A" in FIG. 8). For example, to facilitate easier UAV delivery of packages, the residences 466, 468, 470, 472, 474, and 476 may be associated with aggregate delivery area 480, which may correspond to a location that a UAV may deliver packages for any of the corresponding residences 466-476. Residences 466-476 may correspond to residences on a particular block or in a particular neighborhood, for example, or within a particular housing development or association, according to various implementations, or according to any other appropriate grouping.

In some examples, a UAV can follow a flight route 482 to deliver a package from the warehouse 428 to the aggregate delivery area 480. In general, route 482 begins at or near warehouse 428, crosses roadway/right-of-way 414, proceeds east until near the intersection of roadway/right-of-way 410 and roadway/right-of-way 414, turns south along roadway/right-of-way 410 and continues to near the intersection of roadway/right-of-way 410 and roadway/right-of-way 426, turns east along roadway/right-of-way 426, until arriving at aggregate delivery area 480 (e.g., crossing over roadway/right-of-way 426).

In some examples, communications station A 430 may establish communications with the UAV before the UAV departs from the warehouse 428, and may initially be the primary communications station for the UAV based on its proximity to the UAVs departure point. In some examples, communications station A 430 may remain the primary communications station for the UAV until the UAV reaches a location at or near the intersection of roadway/right-of-way 405 and roadway/right-of-way 414, where communications station B 432 may take over for communications station A 430 as the primary communications station for the UAV. In some examples, communications station B 432 may remain the primary communications station for the UAV until the UAV reaches a location at or near the intersection of roadway/ right-of-way 408 and roadway/right-of-way 414, where communications station C 434 may take over for communications station B 432 as the primary communications station for the UAV. In some examples, communications station C 434 may remain the primary communications station for the UAV until the UAV reaches a location at or near the intersection of roadway/right-of-way 410 and roadway/right-of-way 416, where communications station F 440 may take over for communications station C 434 as the primary communications station for the UAV. In some examples, communications station F 440 may remain the primary communications station for the UAV until the UAV reaches a location at or near the intersection of roadway/right-of-way 410 and roadway/right-of-way 420, where communications station I 446 may take over for communications station F 440 as the primary communications station for the UAV. In some examples, communications station I 446 may remain the primary communications station for the UAV until the UAV reaches a location at or near the intersection of roadway/right-of-way 410 and roadway/right-of-way 424, where communications station L 452 may take over for communications station I 446 as the primary communications station for the UAV. In some examples, communications station L 452 may remain the primary communications station for the UAV while the UAV delivers its package to aggregate delivery area 480.

In various implementations, one or more of the communications stations 430-452 may communicate with one another (e.g., share information), and may communicate UAV traffic information, such as general UAV traffic or congestion levels, UAV traffic or congestion levels associated with a particular air corridor or group of air corridors, UAV traffic or congestion levels associated with a particular right-of-way or right-of-way zone, or UAV traffic or congestion levels associated with a particular area of the environment 400 (e.g., a particular neighborhood, an area in the vicinity of an event, situation, structure, or the like) for example. In some examples, a communications station may use this traffic information to determine an appropriate route or route adjustment for a UAV. For example, if UAV traffic is particularly heavy along one or more portions of route 478, communications station A 430 (or another communications station) may instead suggest that the UAV fly south along roadway/right-of-way 405, 406, 408, 410, or 412, rather than along roadway/route 404 (as depicted in route 478), for example. The communications station A 430 may communicate this route or route adjustment, or another appropriate route adjustment, to the UAV, for example.

With reference again to FIG. 1, in some examples, a UAV 150 can request permission from a communications station 101 to fly outside of a designated area (e.g., outside of a prescribed airspace above a right-of-way or outside of a prescribed airspace above a right-of-way zone). For example, the UAV 150 may be delivering a package to a personal residence, and may need to fly outside of a prescribed airspace to make the delivery. For example, in delivering the package to residence 464 (see FIG. 8), the UAV may temporarily need to fly outside of a right-of-way airspace. In some examples, the communications station 101 may receive the request, and may grant permission for the UAV to fly outside of the prescribed airspace. In some cases, the communications station 101 may monitor the UAV to ensure that the UAV returns to the prescribed airspace within a predetermined period of time, for example. In some examples, the UAV 150 may not request permission from the communications station 101 to fly outside of a designated area.

In some examples, the techniques, systems, and devices discussed herein can instruct, advise, or inform a UAV regarding flying in an airspace above a right-of-way, such as directly above right-of-way 106, 116, or 124, or within a predetermined distance outside of a space directly above right-of-way 106, 116, or 124. In some examples, the techniques, systems, and devices discussed herein can instruct, advise, or inform a UAV regarding flying in an airspace above one of the right-of-way zones 110*a*, 110*b*, 119*a*, 119*b*, 128*a* or 128*b*. For example, in an airspace directly above one of the right-of-way zones 110*a*, 110*b*, 119*a*, 119*b*, 128*a* or 128*b*, or within a predetermined distance outside of a space directly above one of the right-of-way zones 110*a*, 110*b*, 119*a*, 119*b*, 128*a* or 128*b*, such as a lateral extension to the zone.

Figure 3A:
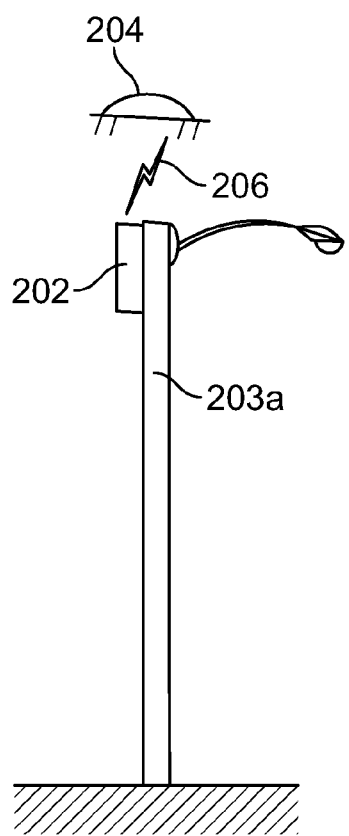

FIGS. 3A, 3B, and 3C are conceptual diagrams of example communication styles that an example communications station can use to communicate with an example UAV. In FIG. 3A, a communications station 202, associated with a lighting assembly 203*a* in this example, is communicating with a UAV 204 via a direct wireless communication link 206. Examples of direct communication link 206 can include, without limitation, a Bluetooth communication link, a near field communication ("NFC") link, a machine-to-machine ("M2M") communication link, a cellular link, an IEEE802-style (e.g., using any of the various IEEE802-based protocols) communication link, an infrared communication link, an ISM band communication link, a radio frequency identification ("RFID") communication link, or other appropriate direct wireless communication link.

In FIG. 3B, the communications station 202, associated with a lighting assembly 203*b* in this example, is communicating with the UAV 204 via a satellite communication link 208, where communications between the communications station 202 and the UAV 204 pass through a satellite 210.

In FIG. 3C, the communications station 202, associated with lighting assembly 203*c* in this example, is communicating with the UAV 204 via a networked communication link 212, where communications between the communications station 202 and the UAV 204 pass through one or more networks 214 (illustrated by a "cloud" in FIG. 3C). Examples of networks 214 can include one or more cellular or other phone-based networks, the Internet, the "cloud" or one or more networks providing access to the Internet or the cloud, one or more mesh networks, a local or wide-area network, a microwave network, a radio frequency network, or other appropriate datalinks or networks as will be known to one of ordinary skill in the art. In various examples, the one or more networks 214 may include a public network and/or a private network.

In FIGS. 3A-3C, the communications station 202 is depicted near the top of the light pole of the lighting assembly. One advantage to locating the communications stations on lighting assemblies is that the lighting assemblies already are wired for power, for example, and locating the communications station near the top of the light pole may dissuade vandals from attempting to tamper with, gain access to, damage, or misappropriate the communications station 202, according to some implementations. In other examples, the communications station 202 could be located at other locations on the light pole or on the lighting assembly, such as nearer the luminaire as depicted in FIG. 3C. As can be seen in FIG. 3C, the communications station 202 is located on a generally horizontal (in some examples) or arched (in some examples) portion of the lighting assembly 203*c*.

The lighting assembly 203a is similar to the lighting assemblies 144 depicted in FIG. 1. FIGS. 3B and 3C show alternative lighting assemblies 203b and 203c, respectively, and in general the communications stations discussed herein may be associated with any type of lighting assembly (e.g., streetlight, parking lot light, traffic light, display monitor). Assembly 203b includes a luminaire 216b that is generally located above the light pole of the assembly 203b. Assembly 203c includes a luminaire 216c generally shaped like a panel, for example. As described previously, the communications stations can also or alternatively be located on traffic lights, utility poles, communications station poles, towers (e.g., cell towers), road signs or display monitors, buildings, trees, billboards, bridges, or other structures within a proximity of a roadway or a right-of-way, according to various implementations. In some examples, the communications station may not be located within a proximity of a roadway or a right-of-way.

In some examples, a mobile communications station may be used. For example, a vehicle (e.g., car, truck, van, or the like) may be equipped with a communications station as described herein or with the functionality of a communications station as described herein. In various implementations, the mobile communications station may be used to provide mechanical, electrical, or information technology support to a UAV, for example. In some examples, the mobile communications station may be used to respond to UAVs that land in a safe landing area (e.g., landing area 156, see FIG. 1). In some examples, the mobile communications station may provide charging services to a UAV that has landed, so that the UAV may recharge its batteries, for example. In some examples, the mobile communications station can retrieve UAVs that may be inoperable or otherwise unable to fly to their intended destination or return to their base. In various implementations, the mobile communications station may be in communications with one or more of the communications stations described herein (e.g., any of the communications stations 101a, 101b, 101c, 101d, 101e, 101f, 202 or other communications stations described herein).

FIG. 4 is a conceptual diagram 220 that depicts an example UAV 221 receiving a charging signal from an example communications station 222. As can be seen in FIG. 4, the UAV 221 is hovering relatively close to the communications station 222. A charging unit 223 of the communications station 222 may transmit a charging signal 224 for receipt by a charging module 226 of the UAV 221, and the charging module 226 of the UAV 221 may use energy received via the charging signal 224 to charge one or more batteries 228 of the UAV 221. In this manner, the UAV 221 may wirelessly charge one or more batteries 228 of the UAV 221 without returning to a base, for example. UAV 221 may wirelessly charge one or more batteries 228 of the UAV 228 without landing (e.g., while remaining airborne), for example. In various implementations, near field charging ("NFC") technologies or other appropriate charging technologies can be used.

In some examples, the UAV 221 can hover relatively near the communications station 222, and can drop or lower a communications or charge cord (not shown), that can make contact with a portion of the communications station 222, and the charging unit 223 can send a charge signal via the charge cord to provide wired charging for the UAV 221. In some examples, the UAV 221 can drop a cable or cord that may or may not make physical contact with the communications station 222, but may be in close proximity to the communications station 222, and may be used to provide ultra short range communications (e.g., messaging communications, wireless charging capability, etc.), which may permit the UAV 221 to hover at a distance (e.g., several feet, yards, or meters from the communications station) yet permit the cable, cord or a portion of the cable or cord to get much closer to the communications station 222 (e.g., within a couple of feet, within one foot, within a few inches, within an inch, or physically touching or contacting), to better facilitate wireless or contact-based charging, in some implementations. In some examples, a releasable magnetic contact may be used to facilitate contact between a portion of the cable or cord and the communications station 222, for example.

The communications station 222 is attached to an example lighting assembly 225 that includes a luminaire 229. Dashed outline 227 shows an example of an alternative location on lighting assembly 225 where communications station 222 could be located in some implementations (or at any other appropriate location on the lighting assembly 225).

In some examples, the communications station 222 tracks a quantity associated with the charging signal 224, such as an amount of energy provided by the communications station 222 to the UAV 221, and a billing module 230 of the communications station 222 can cause a message to be transmitted that includes an indication of an identifier associated with the UAV 221 and the quantity associated with the charging signal. In this fashion, UAV operators can be billed an appropriate amount, for example.

In some examples, the communications station may interrogate the UAV regarding a remaining battery charge for one or more batteries of the UAV. In some examples, the communications station may interrogate the UAV regarding a fuel level for the UAV. In some examples, the communications station may assess, based on the response from the UAV, whether the UAV has sufficient battery power or fuel to reach its intended destination. In some examples, if the communications station determines that the UAV may not have sufficient battery power or fuel to reach its intended destination, the UAV may suggest (e.g., via a transmitted message) that the UAV charge its batteries (e.g., via the communications station as discussed herein with reference to FIG. 4), or may suggest that the UAV land in a safe landing area (e.g. area 156, see FIG. 1), where the UAV may refuel or recharge its batteries, or may obtain other assistance, for example. As another example, the communications station may suggest that the UAV land near a location where a mobile communications station is currently located.

In some examples, a communications station may detect a presence of a UAV in a manner other than by establishing communications with the UAV. For example, some implementations of the communications stations can include one or more sensors that detect a presence of a UAV. In some examples, the communications station includes one or more cameras that can detect a UAV, as by comparing a captured image of the UAV or of a portion of the UAV (e.g., an identification number or other identifier) with a stored image of a UAV or portion of a UAV. After the communications station has detected the presence of the UAV, the communications station may interact with the UAV in one or more of the ways discussed herein, for example.

In some examples, the communications station includes a first directional microphone that may be directed generally upward (e.g., toward the sky), and a second directional microphone that may be directed generally downward (e.g., toward the ground). In some examples, the communications station monitors signals provided by the first microphone and the second microphone, and subtracts the signal of the second microphone from the signal of the first microphone. In some examples, the communications station can use sound isolation or noise cancellation techniques to isolate the background sound to allow the detection of the UAV. The communications station can compare the resulting signal with a stored signal representation of a UAV, to determine a presence of the UAV. After the communications station has detected the presence of the UAV, the communications station may interact with the UAV in one or more of the ways discussed herein, for example. In some examples, a single microphone is used to detect a presence of a UAV.

In some examples, a communications station 101 detects a UAV (e.g., by communicating with the UAV, or as by detection using one or more cameras or microphones) that is unresponsive or uncooperative with the communications station 101. The communications station 101 may store, in a memory location of the communications station, an indication of the UAV such as an identifier associated with the UAV, one or more photos or videos that the communications station captures of the UAV (e.g., using the one or more cameras discussed above), or one or more audio recordings that the communications station captures of the UAV (e.g., using one or more microphones). In some examples, the communications station may transmit a message with an indication of the unresponsive or uncooperative UAV, for receipt by a police unit, civil airspace authority unit, Federal Aviation Administration, or control center or station remote from the communications station, for example. In some examples, the message can include an identifier associated with the UAV, one or more photos or videos of the UAV, or one or more audio recordings associated with the UAV, as well as an indication of the communications station and/or with an area associated with the communications station (e.g., a location identifier or address).

In some examples, the communications station 101 can detect whether a UAV includes a weapon. For example, the communications station may capture a photo, image or video of the UAV, and compare with one or more stored photos, images, or videos to determine that the UAV includes a weapon and may be a threat. In some examples, the UAV can transmit a message with an indication of the UAV determined to include a weapon, for receipt by a police unit, civil airspace authority unit, Federal Aviation Administration, or control center or station remote from the communications station, for example. In some examples, the message can include an identifier associated with the UAV, one or more photos or videos of the UAV, or one or more audio recordings associated with the UAV, as well as an indication of the communications station and/or with an area associated with the communications station (e.g., a location identifier or address).

Figure 5:
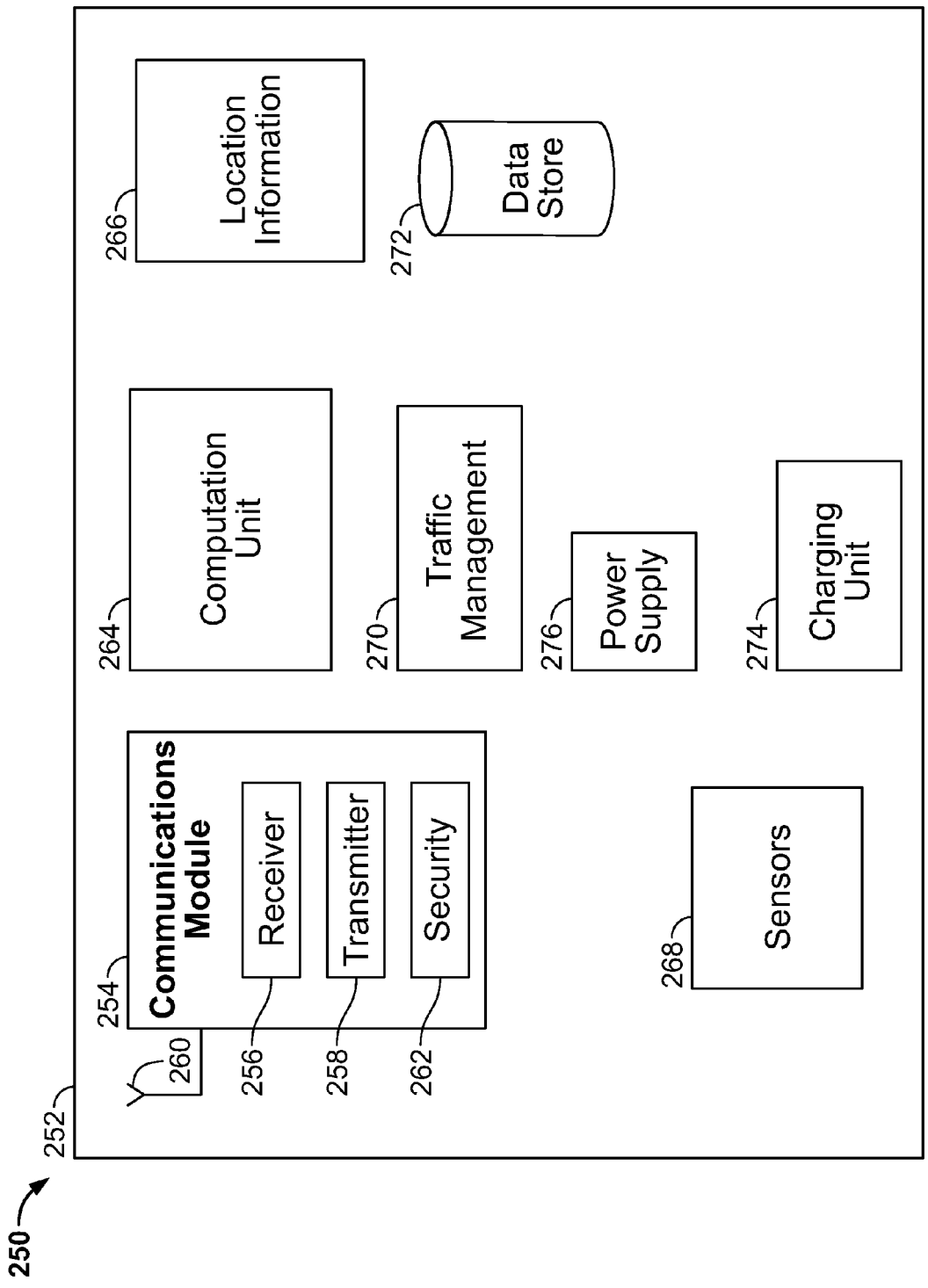
FIG. 5 is a block diagram of an example communications station.

FIG. 5 is a block diagram 250 of an example communications station 252. In some implementations communications station 252 may correspond to any of the communications stations (e.g., stations 101, 202, or 222) described herein. Communications station 252 includes a communications module 254, which includes a communications receiver 256 that can receive wireless (or in some examples, wired) messages and a communications transmitter 258 that can transmit wireless (or in some examples, wired) messages. The communications receiver 256 and communications transmitter 258 may receive and transmit messages, respectively, over one or more antennas 260. Communications module 254 also includes a security component 262, which can be used to encrypt or encode messages to be sent, and decrypt or decode received messages, and optionally to provide a security question and answer, to provide for secure communications between the communications station 252 and a UAV, as will be discussed in further detail below.

A computation unit 264 includes one or more processors that can execute instructions (e.g., software instructions, firmware instructions, or the like) and perform functions for the communications station 252. The communications station 252 includes location information 266. For example, the location information 266 can include location information associated with the communications station 252, or associated with a lighting assembly (e.g., a lighting assembly that the communications station 252 is associated with). The location information 266 can include, without limitation, location information associated with one or more roadways or right-of-ways, with one or more right-of-way zones, with one or more air corridors, with one or more obstacles or impediments, with one or more safe landing zones, with one or more delivery hub areas, with one or more no-fly zones, or with one or more other communications stations. Examples of location information can include one or more GPS coordinates, one or more of latitude/longitude information or latitude/longitude/elevation information, one or more Internet Protocol (IP) addresses or other communications-based addresses, or the like.

The communications station 252 can include one or more sensors 268. For example, the communications station 252 can include one or more sensors that can determine wind velocity and/or wind direction. The communications station 252 can include other weather-related sensors (e.g., an ambient light sensor, a precipitation sensor, a thermometer, an air quality sensor, and the like). In some examples, the communications station 252 can include one or more altitude-detecting or altitude-determining sensors that can be used to determine an altitude at which a UAV is flying, for example. In some examples, the communications station 252 can include one or more position-detecting sensors that can be used to determine a position of a UAV, for example. In some examples, the communications station 252 can include one or more velocity-detecting sensors that can be used to determine a velocity at which a UAV is flying, for example. In some examples, the communications station can include one or more cameras or microphones, for example.

The communications station 252 can include a traffic management module 270. The traffic management module 270 can be used to manage UAV traffic, according to some implementations. For example, the traffic management module 270 may determine an appropriate altitude that a UAV should fly at, and the communications station 252 may communicate an indication of the altitude to the UAV. In some examples, the traffic management module 270 may determine an appropriate air corridor that a UAV should fly in, and the communications station 252 may communicate an indication of the air corridor to the UAV. In some examples, the traffic management module 270 may determine an appropriate altitude range that a UAV should fly within, and the communications station 252 may communicate an indication of the altitude range to the UAV. In some examples, the traffic management module 270 may determine that a UAV is not flying where it is supposed to be flying, and the communications module may transmit a message as described herein above. In some examples, the traffic management module 270 may determine a route for a UAV, or an alternative route based on prevailing traffic conditions, congestion, in-force restrictions (e.g., one or more no-fly zones), or the like. In some examples, the traffic management module may determine that that a first UAV is too close to a second UAV (e.g., within a predetermined distance of the second UAV, or vice versa), and the communications station 252 may send a warning message to one or both of the first UAV and the second UAV.

The communications station 252 includes a data store 272 that can be used to store information, such as information received from one or more UAVs, or information that the communications station uses in performing the functions described herein. In some examples, the communications station 252 stores an identifier associated with a UAV in the data store 272. In some examples, the communications station 252 stores an identifier associated with a UAV and a time stamp in the data store 272. In some examples, the communications station 252 stores an identifier associated with a UAV in the data store 272 after establishing communications with the UAV. In some examples, the communications station 252 stores route information associated with a UAV in the data store 272. In some examples, the communications station 252 stores registration information (e.g., for particular UAVs or registration lists) in the data store 272. In some examples, the communications station 252 stores route information associated with a UAV in the data store 272. In some examples, the communications station 252 stores information associated with other communications station in the data store 272. In some examples, the communications station 252 stores photos, images, audio files or recordings, and other information in the data store 272. In some examples, the communications station 252 stores information associated with a police department, fire department, civil airspace authority, Federal Aviation Authority, weather service, location service, control center, delivery hub area, mobile communications station, or delivery company in the data store 272. In some examples, the communications station 252 stores information associated with a ticket or fine (e.g., a speeding ticket, noise ticket, emissions ticket, no-fly zone ticket, or the like) in the data store 272

The communications station 252 includes a charging unit 274 that may provide a charging signal that a UAV can use to charge one or more batteries of the UAV. A power source 276 provides one or more voltages to the various electronic components of the communications station 252. Communications station 252 is housed in an enclosure, which may be made of any appropriate material such as plastic, metal, graphite or other composite material, or other appropriate materials. The enclosure can protect the components of the communications station from the elements, and in some examples from nefarious attempts to gain physical access to the communications station.

In some examples, the lighting assembly with which the communications station is associated includes a power meter that tracks an amount of power used by the communications station (e.g., over a predetermined period of time). In some examples, the power meter may be included with the communications station (not shown in FIG. 5). In various implementations, the power meter may be read or interrogated to determine the amount of power used. In some examples, the power meter transmits out such information for receipt by a utility company, for example, or by a control center.

In some examples, a first communications station may communicate with one or more other communications stations. For example, the first communications station may communicate with one or more other communications station within a predetermined distance of the first communication station at periodic intervals (e.g., once per minute, per two minutes, per five minutes, per ten minutes, per hour, or the like) to confirm that the one or more other communications stations are operational (e.g., by receiving a response message from the one or more other communications stations). In the event that one or more of the other communications stations is not operational or is inoperable (e.g., because of a failure), in some implementations the first communications station may assume communications responsibility for the one or more inoperable communications stations. For example, the first communications station may initiate communications with UAVs in a vicinity of the one or more failed communications stations in the manner that the failed communications stations would ordinarily communicate with the UAVs when operating correctly. In this manner, a redundancy may be built into the system, for example, which may provide for more robust performance. The first communications station may store, in one or more memory locations of the first communication station, information regarding the one or more other communications stations within the predetermined distance of the first communication station to permit the first communications station to assume the communications responsibility if needed, for example.

Figure 6:
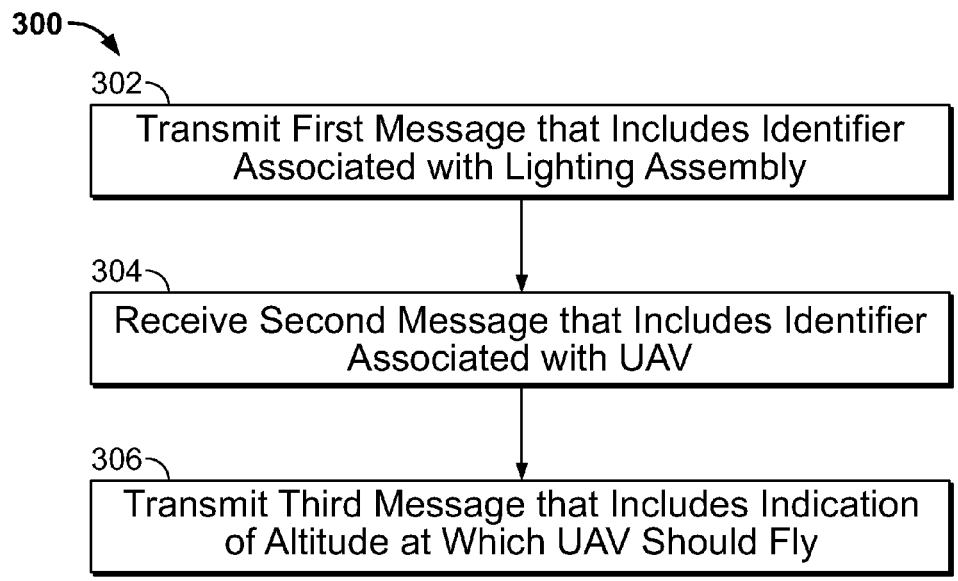
FIG. 6 is a flowchart of an example method that can be used to communicate with an unmanned aerial vehicle.

FIG. 6 is a flowchart 300 of an example method that can be used to communicate with an unmanned aerial vehicle. At a first step 302, a first message is transmitted for receipt by a UAV, where the first message includes an identifier associated with a lighting assembly. In some examples, the first message may be transmitted via a communications transmitter of a lighting assembly. In some examples, the lighting assembly can be located within a proximity of a roadway. The identifier associated with the lighting assembly can be an identifier of the lighting assembly or of a communications station associated with the lighting assembly, for example. The identifier can be a location indicator, such as one or more GPS coordinates, latitude/longitude information, or latitude/longitude/elevation information associated with the lighting assembly or with a communications station that is associated with the lighting assembly. In some examples, the first message can include an indication of weather. In some examples, the first message can include an indication of speed (e.g., a speed limit). In some examples, the first message can include an indication of a noise level or of an emissions level. In some examples, the first message can include an indication of one or more safe landing zones, or of one or more delivery hub areas. In some examples, the first message can include an indication of one or more obstacles or impediments. In some examples, the first message can include an indication of a no-fly zone.

A second message is received, at a second step 304, from the UAV, and the second message includes an identifier associated with the UAV. In some examples, the second message can include location information associated with the UAV (e.g., one or more GPS coordinates, latitude/longitude information, or latitude/longitude/elevation information of the UAV). In some examples, the second message can include route information. In some examples, the second message can include information descriptive of the UAV, such as the type of UAV, a company that the UAV is associated with, registration information or license information for the UAV, and the like. In some examples, the second message can include a request for charging energy that the UAV can use to charge one or more batteries of the UAV.

At step 306, a third message is transmitted for receipt by the UAV, where the third message includes an indication of an altitude at which the UAV should fly. In some examples, the indication of the altitude at which the UAV should fly includes an indication of an air corridor, where the air corridor is associated with a predetermined minimum altitude and a predetermined maximum altitude. In some examples, the third message includes an indication of an altitude of the UAV (e.g., an altitude that the UAV is currently flying at). In some examples, the third message includes one or more altitude levels. For example, the third message may include an altitude range to indicate that the UAV should fly within the altitude range. In some examples, the third message includes an indication of direction (e.g., a heading or compass heading). In some examples, the third message includes an indication of velocity, such as a velocity that the UAV is currently flying at, or one or more speed limits (e.g., a maximum speed, a minimum speed, or both). In some examples, the third message includes one or more of the possible message items discussed above with reference to the first message at step 302.

In some examples, communications between a communications station and a UAV, or between communications stations, or between a communications station and a control center or station or other entities discussed herein, can include a security feature that may be used to help combat against nefarious intent by unauthorized parties. For example, in addition to message encryption on the transmission side and decryption on the receive side, transmitted messages can include a challenge question. A receiver of the message could then interpret the challenge question and provide an answer to the challenge question. If the receiver provides the correct answer to the challenge question, the receiver would gain effective access to a payload of the message, whereas if the receiver provides an incorrect answer to the challenge question, the receiver would not be able to access the payload of the message.

Figure 7:
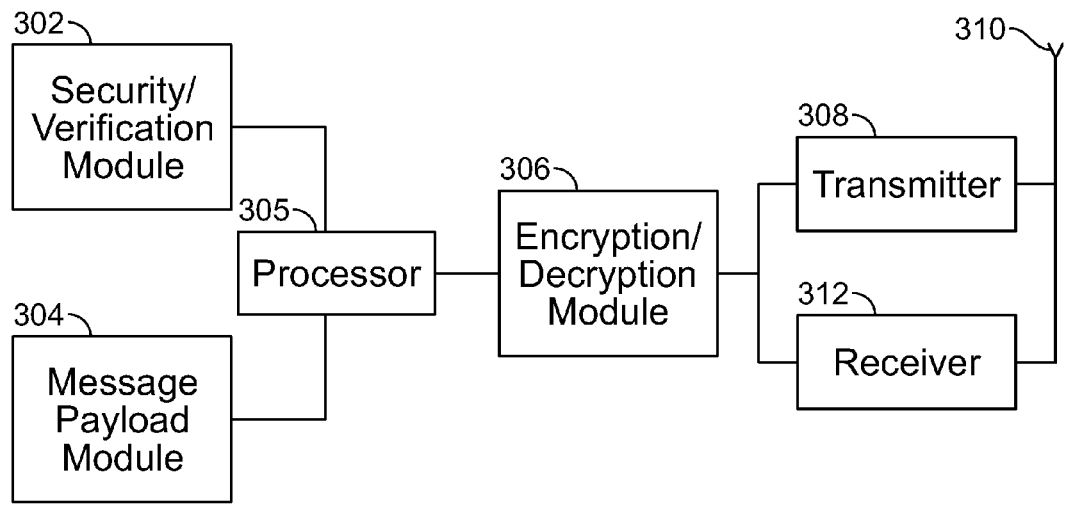
FIG. 7 is a block diagram of an example communications component.

FIG. 7 illustrates an example of equipment that can be used to implement an example heightened security communications protocol. A security/verification module 302 may create a challenge question and a corresponding answer to the challenge question, and a message payload module 304 may create a payload for the message. A processor 305 may receive the challenge question and answer from the security/verification module 302 and may receive the message payload from the message payload module 304, and may arrange them and forward them to an encryption/decryption module 306. In some examples, some or all of the functions of the message payload module 304 can be performed by the processor 305. In some examples, the processor 305 may correspond to computation unit 264 (see FIG. 5). The payload, challenge question and answer may be encrypted by the encryption/decryption module 306. The payload, challenge question and answer may be signed by the encryption/decryption module 306. Thereafter, a transmitter 308 may transmit the message wirelessly via one or more antennas 310. Wired transmission may also be possible in some implementations. In various examples, the message may be transmitted over one or more networks, or in one or more manners as discussed above with reference to FIGS. 3A, 3B, and 3C.

A message may be wirelessly received via the one or more antennas 310 at a receiver 312. The receiver 312 delivers the encrypted message to the encryption/decryption module 306, where the message is authenticated and the payload is decrypted. The decrypted payload is then delivered to processor 305, which in some examples parses the payload and in some examples passes the payload to the message payload module 304 for parsing. The processor 305 also delivers the challenge question to the security/verification module 302. The security/verification module 302 may interpret the challenge question and reply with an answer to the question. The processor 305 can verify that the response from the security/verification module 302 matches the answer included in the message, and can process the payload if the answer is correct. If the answer is incorrect, the processor 305 may not be able to process the payload. This may add an extra layer of security to standard encryption/decryption methods, and may add a specific check on security. In some examples, an entity in charge of the communications stations may be the only party with access to security/verification module 302. In some cases, challenge-response security pairs may be one-time-use only, and may be time-limited. The security/verification module 302 may need to provide a correct response within a predetermined period of time; otherwise a timeout may prevent further action.

In some examples, if a security question is incorrectly answered one or more times (e.g., at a UAV or at a communications station), or after a predetermined number of times, the communications station may notify police, civil airspace authorities, the Federal Aviation Administration, the control center, or other appropriate authority. In some examples, some airspaces may be closed down if it is determined that a threat condition exists. Closing an airspace can also occur when other emergency or threat conditions described herein occur (e.g., when it is determined that a UAV might present a threat or might include a weapon).

In some implementations, all communications between components of the system may be subject to a security protocol similar to that described above with reference to FIG. 7. For example, communications stations, UAVs, and control centers or stations may include one or more aspects of FIG. 7 (e.g., encryption/decryption module 306, processor 305, security/verification module 302, message payload module 304, transmitter 308, receiver 312) and may assemble and encode and/or parse and decode messages in the manner described above.

In some cases, encryption and decryption provided by module 306 may be sufficient to alleviate security concerns, but in some cases the extra security afforded by the challenge question (or security question) and answer functionality may be desired. System components that send messages may be configured to provide payloads and challenge questions/responses. System components that receive messages may be configured to receive and process the payloads and challenge questions. In various implementations, the communications algorithms used by the various components may include detection of attempts by unauthorized parties to jam or hijack the system, as by a type of cyber-attack, or nuisance disturbances designed to trick the system. In some examples, a single IP address can be used for communication between components of the system. In some examples, two IP addresses can be used for communication between components of the system. In some implementations, heightened security communications may not be needed, and communications may occur without security questions/answers.

Some or all of the techniques discussed herein can be used to supplement existing UAV communications protocols, according to various implementations. For example, for UAVs that rely primarily on received GPS signals to navigate, some or all of the techniques discussed herein may provide secondary, supplemental or redundant information or support to the UAV at times when the UAV is unable to communicate (transmit, receive, or both) in its primary manner. In some implementations, this may provide a more robust operating environment for UAVs, for example.

Figure 9:
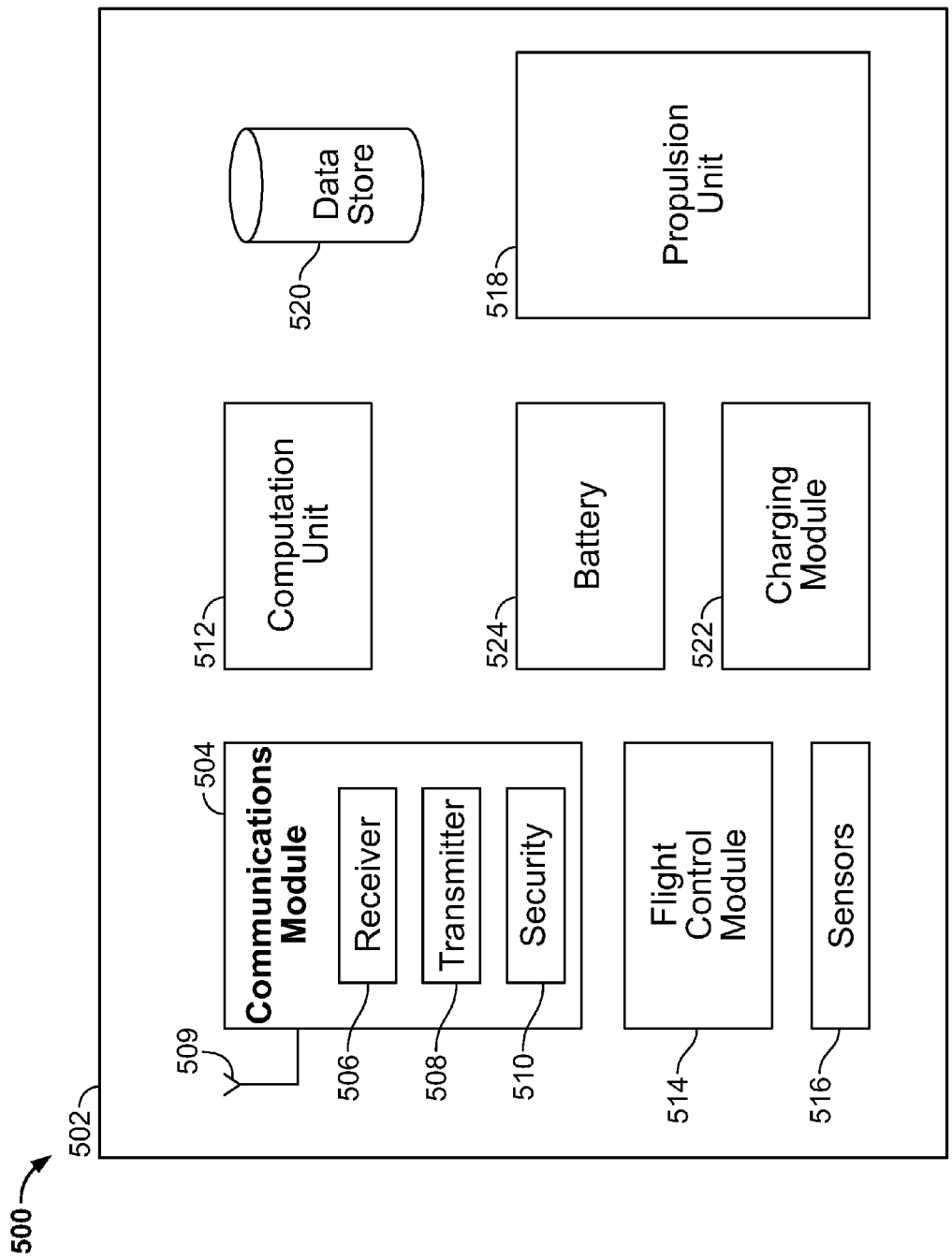
FIG. 9 is a block diagram of an example unmanned aerial vehicle.

FIG. 9 is a block diagram 500 of an example UAV 502. The example UAV 502 is depicted in a simplified representation, and may represent any of the UAVs discussed herein, for example. UAV 502 may represent any of various types of UAVs with which the communications stations discussed herein may communicate.

UAV 502 includes a communications module 504, which includes a communications receiver 506 that can receive wireless messages and a communications transmitter 508 that can transmit wireless messages. The communications receiver 506 and communications transmitter 508 may receive and transmit messages, respectively, over one or more antennas 509. Communications module 504 also includes a security component 510, which can be used to encrypt or encode messages to be sent, and decrypt or decode received messages, and optionally to provide a security question and answer, to provide for secure communications between a communications station and the UAV 502, as described above. In some examples, wired communications can be used.

A computation unit 512 includes one or more processors that can execute instructions (e.g., software instructions, firmware instructions, or the like) and perform functions for the UAV 502. The UAV 502 includes a flight control module 514 that controls flight operations for the UAV 502. In some examples, the flight control module 514 controls operations relating to takeoff, landing, and in-flight operations. In some examples, the flight control module 514 controls navigation operations for the UAV 502. In some examples, the flight control module includes navigational instrumentation. In some examples, the flight control module 514 responds to navigational commands (e.g., from a communications station such as described herein, from a ground-based control station or system, from a mobile control station or system, or the like), and implements them at the UAV 502. The UAV 502 includes one or more sensors 516 that can be used to aid in aspects of operating the UAV 502. The UAV 502 includes a propulsion unit 518 that can be used for propelling and providing altitude control and directional control for the UAV 502.

The UAV 502 includes a data store 520 that can be used to store information for aspects of UAV operation. Examples of information that can be stored in the data store 520 can include, without limitation, route information, communications station information, registration or license information, communications protocol information, weather information, map-related information, retailer order and delivery information, product information, permission information, and others.

A charging module 522 (which may correspond to the charging module 226 of FIG. 4 in some implementations) can be used to charge one or more batteries 524 of the UAV 502. As described above with reference to FIG. 4, the charging module 522 can wirelessly receive a charging signal from a communications station, according to some implementations. In some examples, the UAV 502 may recharge one or more of its batteries while airborne, as by receiving a charging signal from a communications station such as depicted in FIG. 4, for example. Wired charging may also be used, according to some implementations. In some examples, the one or more batteries 524 may provide propulsion power to the UAV 502 and one or more voltages for operating the electronic components of the UAV 502. In some examples, the UAV 502 may be powered by gas or by another appropriate fuel, to provide propulsion power.

In some examples, the UAV 502 includes a parachute (not shown in FIG. 9), and a parachute deployment module (not shown in FIG. 9). In various implementations, the parachute deployment module of the UAV may determine that the UAV should deploy its parachute, which may assist the UAV in landing in some implementations. In some examples, the UAV 502 may receive a message from a communications station (e.g., station 101a) that instructs the parachute deployment module of the UAV to deploy the parachute of the UAV.

In some examples, the UAV 502 includes an airbag (not shown in FIG. 9), and an airbag deployment module (not shown in FIG. 9). In various implementations, the airbag deployment module of the UAV may determine that the UAV should deploy its airbag, which may partially or completely surround the UAV and protect the UAV, and which may assist the UAV in landing in some implementations. For example, the airbag may protect the UAV or limit damage to the UAV in a crash landing, as well as potentially protecting or minimizing damage or injury to pedestrians, vehicles, or property. In some examples, the UAV 502 may receive a message from a communications station (e.g., station 101a) that instructs the airbag deployment module of the UAV to deploy the airbag of the UAV. In some examples, the airbag may be deployed in combination with a deployment of the parachute, discussed above.

Various communications protocols can be used between the communications stations discussed herein and a UAV. In some examples, the communications station transmits or emits a beacon message periodically (e.g., once per second, once per couple seconds, once per five seconds, once per 10 seconds, once per 15 seconds, once per 20 seconds, once per 25 seconds, once per 30 seconds, once per minute, or the like), and a UAV receives the beacon message and replies by transmitting a message for receipt by the communications station. In some examples, the UAV receives the message, which may include any of the information discussed above herein with reference to FIG. 1, and does not reply to the communications station.

In some examples, the UAV transmits or emits a beacon message periodically (e.g., once per second, once per couple seconds, once per five seconds, once per 10 seconds, once per 15 seconds, once per 20 seconds, once per 25 seconds, once per 30 seconds, once per minute, or the like) and a communications station receives the beacon message and replies by transmitting a message for receipt by the UAV.

The communications stations described herein, and/or the UAVs described herein, can include one or more of the following components: processors, memory (e.g., random access memory (RAM) and/or other forms of volatile memory), storage devices (e.g., solid-state hard drive, hard disc drive, and/or other forms of non-volatile memory), high-speed interfaces connecting various components to each other (e.g., connecting one or more processors to memory and/or to high-speed expansion ports), and/or low speed interfaces connecting various components to each other (e.g., connecting one or more processors to a low speed bus and/or storage devices). Such components can be interconnected using various busses, and may be mounted across one or more motherboards or circuit boards that are communicatively connected to each other, or in other appropriate manners.

In some implementations, computing devices can include pluralities of the components listed above, including a plurality of processors, a plurality of memories, a plurality of types of memories, a plurality of storage devices, and/or a plurality of buses. A plurality of computing devices can be connected to each other and can coordinate at least a portion of their computing resources to perform one or more operations.

Processors can process instructions for execution within computing devices, including instructions stored in memory and/or on storage devices. Such processing of instructions can cause various operations to be performed, such as the operations, tasks, or methods discussed herein. Processors can be implemented as a chipset of chips that include separate and/or multiple analog and digital processors. Processors may be implemented using any of a number of architectures, such as a CISC (Complex Instruction Set Computers) processor architecture, a RISC (Reduced Instruction Set Computer) processor architecture, and/or a MISC (Minimal Instruction Set Computer) processor architecture. Processors may provide, for example, coordination of other components computing devices, such as control of user interfaces, applications that are run by the devices, and wireless communication by the devices.

Memory can store information within computing devices, including instructions to be executed by one or more processors. Memory can include a volatile memory unit or units, such as synchronous RAM (e.g., double data rate synchronous dynamic random access memory (DDR SDRAM), DDR2 SDRAM, DDR3 SDRAM, DDR4 SDRAM), asynchronous RAM (e.g., fast page mode dynamic RAM (FPM DRAM), extended data out DRAM (EDO DRAM)), graphics RAM (e.g., graphics DDR4 (GDDR4), GDDR5). In some implementations, memory can include a non-volatile memory unit or units (e.g., flash memory). Memory can also be another form of computer-readable medium, such as magnetic and/or optical disks. Storage devices can be capable of providing mass storage for computing devices and can include a computer-readable medium, such as a floppy disk device, a hard disk device, an optical disk device, a Microdrive, or a tape device, a flash memory or other similar solid state memory device, or an array of devices, including devices in a storage area network or other configurations. Computer program products can be tangibly embodied in an information carrier, such as memory, storage devices, cache memory within a processor, and/or other appropriate computer-readable medium. Computer program products may also contain instructions that, when executed by one or more computing devices, perform one or more methods or techniques, such as those described above.

Computing devices may communicate wirelessly through one or more communication interfaces, which may include digital signal processing circuitry when appropriate. Communication interfaces may provide for communications under various modes or protocols, such as GSM voice calls, messaging protocols (e.g., SMS, EMS, or MMS messaging), CDMA, TDMA, PDC, WCDMA, CDMA2000, GPRS, 4G protocols (e.g., 4G LTE), and/or other appropriate protocols. Such communication may occur, for example, through one or more radio-frequency transceivers. In addition, short-range communication may occur, such as using a Bluetooth, Wi-Fi, or other such transceivers. In addition, a GPS (Global Positioning System) receiver module may provide additional navigation- and location-related wireless data to computing devices, which may be used as appropriate by applications running on computing devices.

Computing devices can also include one or more sensors through which various states of and around the computing devices can be detected. For example, computing devices can include one or more accelerometers that can be used to detect motion of the computing devices and details regarding the detected motion (e.g., speed, direction, rotation); one or more gyroscopes that can be used to detect orientation of the computing devices in 3D space; light sensors that can be used to detect levels of ambient light at or around the computing devices; touch and presence sensors that can be used to detect contact and/or near-contact with one or more portions of the computing devices; environmental sensors (e.g., barometers, photometers, thermometers) that can detect information about the surrounding environment (e.g., ambient air temperature, air pressure, humidity); other motion sensors that can be used to measure acceleration and rotational forces (e.g., gravity sensors, rotational vector sensors); position sensors that can be used to detect the physical position of the computing devices (e.g., orientation sensors, magnetometers), and/or other appropriate sensors.

Various implementations of the systems, devices, and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

In some implementations, UAVs may fly directly from point-to-point (e.g., directly from a warehouse to a residence) without regard for right-of-ways or right-of-way zones, or with only partial regard for right-of-ways or right-of-way zones, and in such implementations the communications stations discussed herein may communicate with the UAVs in similar manners as discussed herein above, including providing any of the information discussed herein above to the UAV or receiving any of the information discussed herein above from the UAV, without limitation.

The above description provides examples of some implementations. Other implementations that are not explicitly described above are also possible, such as implementations based on modifications and/or variations of the features described above. For example, the techniques described above may be implemented in different orders, with the inclusion of one or more additional steps, and/or with the exclusion of one or more of the identified steps. Additionally, the steps and techniques described above as being performed by some computing devices and/or systems may alternatively, or additionally, be performed by other computing devices and/or systems that are described above or other computing devices and/or systems that are not explicitly described. Similarly, the systems, devices, and apparatuses may include one or more additional features, may exclude one or more of the identified features, and/or include the identified features combined in a different way than presented above. Features that are described as singular may be implemented as a plurality of such features. Likewise, features that are described as a plurality may be implemented as singular instances of such features. The drawings are intended to be illustrative and may not precisely depict some implementations. Variations in sizing, placement, shapes, angles, and/or the positioning of features relative to each other are possible.

The above description is intended to be illustrative, without limitation. A number of implementations and examples have been described. Nevertheless, it will be understood that various modifications may be made. Accordingly, other implementations are within the scope of the following claims.

What is claimed is:

1. A computer-implemented method of communicating with an unmanned aerial vehicle, comprising:
    transmitting, via a transmitter of a communications station, a first message for receipt by an unmanned aerial vehicle, the first message comprising an identifier associated with the communications station, wherein the communications station is mounted to a lighting assembly that is located within a proximity of a roadway, and wherein at least a portion of the lighting assembly is configured to remain in physical contact with the ground;

receiving a second message from the unmanned aerial vehicle via a receiver of the communications station, the second message comprising an identifier associated with the unmanned aerial vehicle; and transmitting a third message via the transmitter of the communications station for receipt by the unmanned aerial vehicle, the third message comprising an indication of an altitude at which the unmanned aerial vehicle should fly.

2. The computer-implemented method of claim 1, wherein the indication of the altitude at which the unmanned aerial vehicle should fly comprises an identifier of an air corridor having associated therewith a predetermined minimum altitude and a predetermined maximum altitude.

3. The computer-implemented method of claim 1, further comprising determining, via a computation unit of the communications station, an altitude of the unmanned aerial vehicle, and wherein the third message includes the altitude of the unmanned aerial vehicle.

4. The computer-implemented method of claim 3, wherein the identifier associated with the unmanned aerial vehicle includes a location indicator of the unmanned aerial vehicle, and wherein determining the altitude of the unmanned aerial vehicle is based on the location indicator of the unmanned aerial vehicle and on a location identifier of the lighting assembly.

5. The computer-implemented method of claim 1, wherein the identifier associated with the communications station includes a location identifier of the communications station.

6. The computer-implemented method of claim 5, wherein the location identifier of the communications station includes one or more GPS coordinates associated with the communications station.

7. The computer-implemented method of claim 1, wherein the roadway is associated with a right-of-way, and wherein the identifier associated with the communications station includes a location indicator associated with the right-of-way.

8. The computer-implemented method of claim 7, wherein the identifier associated with the unmanned aerial vehicle includes a location indicator of the unmanned aerial vehicle, further comprising determining that the unmanned aerial vehicle is outside of an airspace associated with the right-of-way, and wherein the third message includes a warning that the unmanned aerial vehicle is outside of the airspace associated with the right-of-way.

9. The computer-implemented method of claim 1, wherein the first message further comprises an indication of a landing area.

10. The computer-implemented method of claim 1, wherein the first message further comprises a location identifier associated with an obstacle.

11. The computer-implemented method of claim 1, further comprising storing in a memory location of the communications station the identifier associated with the unmanned aerial vehicle and a time stamp.

12. The computer-implemented method of claim 11, further comprising transmitting a fourth message via the transmitter of the communications station for receipt by a control center remote from the lighting assembly, the fourth message including the identifier associated with the unmanned aerial vehicle and the time stamp.

13. The computer-implemented method of claim 1, further comprising transmitting, from a charging unit of the communications station, a wireless charging signal for receipt by the unmanned aerial vehicle for charging a battery of the unmanned aerial vehicle.

14. The computer-implemented method of claim 13, further comprising transmitting a fourth message via the transmitter of the communications station, the fourth message comprising the identifier associated with the unmanned aerial vehicle and a quantity associated with the wireless charging signal.

15. The computer-implemented method of claim 1, wherein each of the first message, the second message, and the third message is encrypted for security.

16. The computer-implemented method of claim 15, wherein each of the first message the second message, and the third message includes a security question.

17. The computer-implemented method of claim 1, wherein the identifier associated with the unmanned aerial vehicle includes a location indicator of the unmanned aerial vehicle, and further comprising:

determining that the unmanned aerial vehicle is within a predetermined distance of a second unmanned aerial vehicle based on the location indicator of the unmanned aerial vehicle and on information received from the second unmanned aerial vehicle;

wherein the third message further comprises a warning that the unmanned aerial vehicle is within the predetermined distance of the second unmanned aerial vehicle.

18. The computer-implemented method of claim 17, further comprising determining a navigational adjustment for the unmanned aerial vehicle, and wherein the third message further comprises the navigational adjustment for the unmanned aerial vehicle.

19. The computer-implemented method of claim 1, wherein the first message further includes an indication of weather.

20. The computer-implemented method of claim 1, wherein the first message further includes an indication of a speed.

21. The computer-implemented method of claim 1, further comprising determining a speed of the unmanned aerial vehicle.

22. The computer-implemented method of claim 21, wherein the speed of the unmanned aerial vehicle exceeds a predetermined speed threshold, and further comprising transmitting a fourth message that includes an indication of the speed of the unmanned aerial vehicle.

23. The computer-implemented method of claim 1, wherein the first message further includes an indication of a noise level.

24. The computer-implemented method of claim 1, wherein the first message further includes an indication of an emissions level.

25. The computer-implemented method of claim 1, wherein the identifier associated with the unmanned aerial vehicle includes license or registration information for the unmanned aerial vehicle, and further comprising determining whether the license or registration information for the unmanned aerial vehicle is valid.

26. The computer-implemented method of claim 1, further comprising determining that the unmanned aerial vehicle includes a weapon.

27. The computer-implemented method of claim 1, wherein the first message includes an indication of an area that the unmanned aerial vehicle should avoid.

28. A lighting assembly, comprising:
- a light pole located within a proximity of a roadway, wherein at least a portion of the light pole is configured to remain in physical contact with the ground;
- a luminaire attached to the light pole; and
- a communications station mounted to the light pole, the communications station comprising:
- a communications transmitter configured to transmit a first message for receipt by an unmanned aerial vehicle, the first message comprising an identifier associated with the communications station;
- a communications receiver configured to receive a second message from the unmanned aerial vehicle, second message comprising an identifier associated with the unmanned aerial vehicle; and
- a processing module configured to determine an altitude at which the unmanned aerial vehicle should fly;
- wherein the communications transmitter is further configured to transmit a third message for receipt by the unmanned aerial vehicle, the third message comprising an indication of the altitude at which the unmanned aerial vehicle should fly.

29. The lighting assembly of claim 28, wherein the indication of the altitude at which the unmanned aerial vehicle should fly comprises an identifier of an air corridor having associated therewith a predetermined minimum altitude and a predetermined maximum altitude.

30. The lighting assembly of claim 28, wherein the processing module is further configured to determine an altitude of the unmanned aerial vehicle, and wherein the third message includes the altitude of the unmanned aerial vehicle.

* * * * *